(12) United States Patent
Pandya et al.

(10) Patent No.: US 11,049,067 B2
(45) Date of Patent: *Jun. 29, 2021

(54) WORKFLOW MANAGEMENT SYSTEM INTEGRATING ROBOTS

(71) Applicant: inVia Robotics, Inc., Agoura Hills, CA (US)

(72) Inventors: Sagar Pandya, Agoura Hills, CA (US); Daniel Frank Parks, II, Los Angeles, CA (US); Randolph Charles Voorhies, Culver City, CA (US); Lior Elazary, Agoura Hills, CA (US)

(73) Assignee: INVIA ROBOTICS, INC., Agoura Hills, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/194,679

(22) Filed: Nov. 19, 2018

(65) Prior Publication Data

US 2019/0095854 A1    Mar. 28, 2019

Related U.S. Application Data

(63) Continuation of application No. 15/371,877, filed on Dec. 7, 2016, now Pat. No. 10,134,006.

(51) Int. Cl.
*B65G 1/04* (2006.01)
*G06Q 10/08* (2012.01)
*G05B 19/418* (2006.01)

(52) U.S. Cl.
CPC ......... *G06Q 10/087* (2013.01); *B65G 1/0492* (2013.01); *G05B 19/41895* (2013.01)

(58) Field of Classification Search
None
See application file for complete search history.

(56) References Cited

U.S. PATENT DOCUMENTS

| | | | |
|---|---|---|---|
| 8,594,834 B1 | 11/2013 | Clark et al. | |
| 9,020,631 B1 | 4/2015 | Bellavance et al. | |
| 9,120,622 B1* | 9/2015 | Elazary | B25J 19/023 |
| 9,242,799 B1 | 1/2016 | O'Brien et al. | |
| 9,327,397 B1* | 5/2016 | Williams | B25J 3/04 |
| 9,394,107 B1* | 7/2016 | Eller | B65B 57/02 |
| 9,540,171 B2 | 1/2017 | Elazary et al. | |
| 9,785,911 B2 | 10/2017 | Galluzzo et al. | |
| 2001/0020197 A1 | 9/2001 | Nakano et al. | |
| 2005/0151842 A1* | 7/2005 | Oohashi | G06K 9/00664 348/86 |

(Continued)

FOREIGN PATENT DOCUMENTS

CA    2836933 A1    12/2012

*Primary Examiner* — Fateh M Obaid
(74) *Attorney, Agent, or Firm* — Ansari Katiraei LLP; Arman Katiraei; Sadiq Ansari

(57) ABSTRACT

A workflow management system (WMS) coordinates, controls, and monitors item picking assets, item retrieval assets, and order packaging assets in performance of different workflows. The WMS optimizes the different workflows by assigning tasks to the different assets in a manner that minimizes overall execution time, cost, and resource utilization. Some optimizations include maximizing or prioritizing item pick rate, item packaging rate, or both. Assets integrated with the WMS and under WMS control include human workers, autonomous robots, and resources used in performance of the workflows.

13 Claims, 13 Drawing Sheets

(56) References Cited

U.S. PATENT DOCUMENTS

| | | | |
|---|---|---|---|
| 2006/0004486 A1* | 1/2006 | Yoshikawa | B60W 50/14 |
| | | | 700/245 |
| 2007/0129847 A1 | 6/2007 | Ulmer et al. | |
| 2014/0277691 A1 | 9/2014 | Jacobus et al. | |
| 2015/0032252 A1* | 1/2015 | Galluzzo | B25J 15/0608 |
| | | | 700/218 |
| 2015/0073589 A1 | 3/2015 | Khodl et al. | |
| 2017/0121113 A1 | 5/2017 | Wagner et al. | |
| 2017/0136632 A1 | 5/2017 | Wagner et al. | |
| 2017/0278047 A1* | 9/2017 | Welty | G05D 1/0011 |
| 2017/0334646 A1 | 11/2017 | High et al. | |
| 2020/0202285 A1* | 6/2020 | Elazary | G05D 1/0287 |

* cited by examiner

WORKFLOW MANAGEMENT SYSTEM INTEGRATING ROBOTS

CLAIM OF BENEFIT TO RELATED APPLICATIONS

This application is a continuation of U.S. nonprovisional application Ser. No. 15/371,877 entitled "Workflow Management System Integrating Robots", filed Dec. 7, 2016. The contents of application Ser. No. 15/371,877 are hereby incorporated by reference.

BACKGROUND INFORMATION

Robotic automation is used to supplement humans in certain capacities and replace humans in other capacities more suited or more efficient for the robots to perform. The increasing impact of robotic automation can be seen in many fields. One such field is commerce and e-commerce, in particular.

With respect to e-commerce, robots assist in various tasks related to customer order fulfillment including traversing a warehouse in order to locate, pick, and retrieve ordered items. Robots can be more efficient in these tasks than humans because of their ability to run almost continuously during all hours of the day. Robots can also be configured with special purpose hardware and software that allows them to perform tasks faster than humans or without supplemental equipment. For instance, robots can be configured with maps or rely on hardware sensors to rapidly locate item locations in a vast warehouse. Robots could also move faster than humans, carry more items than a human, and use lifts to reach locations inaccessible by humans without a ladder as some examples.

However, these efficiencies are dependent on proper command and control of the robots. A robot with the fastest means of locomotion can be entirely inefficient if it is continually taking sub-optimal paths to reach a destination or is continually running into obstructions and rerouting. Robots are also inefficient if they operate independent of one another rather than operate as a collective swarm. For example, two robots may travel the same distance in order for each robot to retrieve a different item from a common location. In this case, it would be more efficient for the first robot to retrieve both items from the common location while the second robot sets about retrieving a third item at a different location or performs some other tasks. As another example, it would be more efficient for a first robot already at a first location to retrieve an item from that first location and a second robot already at a second location to retrieve an item from that second location, rather than have the first robot travel to the second location to retrieve an item and the second robot travel to the first location to retrieve an item.

These command and control problems are exacerbated as more robots are deployed in the same site and the robots are used in performing similar or non-distinct tasks. Isolated command and control of individual robots cannot optimize for resource sharing and other conflicts that undoubtedly occur once the robots set about their individual tasks.

For these and other reasons, a workflow management system is needed to provide coordinated command and control for a plurality of robots operating in a common site. As humans remain an integral component to many of the workflows that involve robots, there is a need for the workflow management system to also coordinate human and robot interactions as well as human-to-human interactions.

In summary, there is a need for a workflow management system that maximizes efficiency and productivity of robots, humans, and other resources. More specifically, there is a need for the workflow management system to coordinate and control interactions of the robots, humans, and other resources in a collective and holistic manner.

BRIEF DESCRIPTION OF THE DRAWINGS

A preferred embodiment of a workflow management system (WMS) will now be described, by way of example only, with reference to the accompanying drawings in which.

DETAILED DESCRIPTION OF PREFERRED EMBODIMENTS

Figure 1:
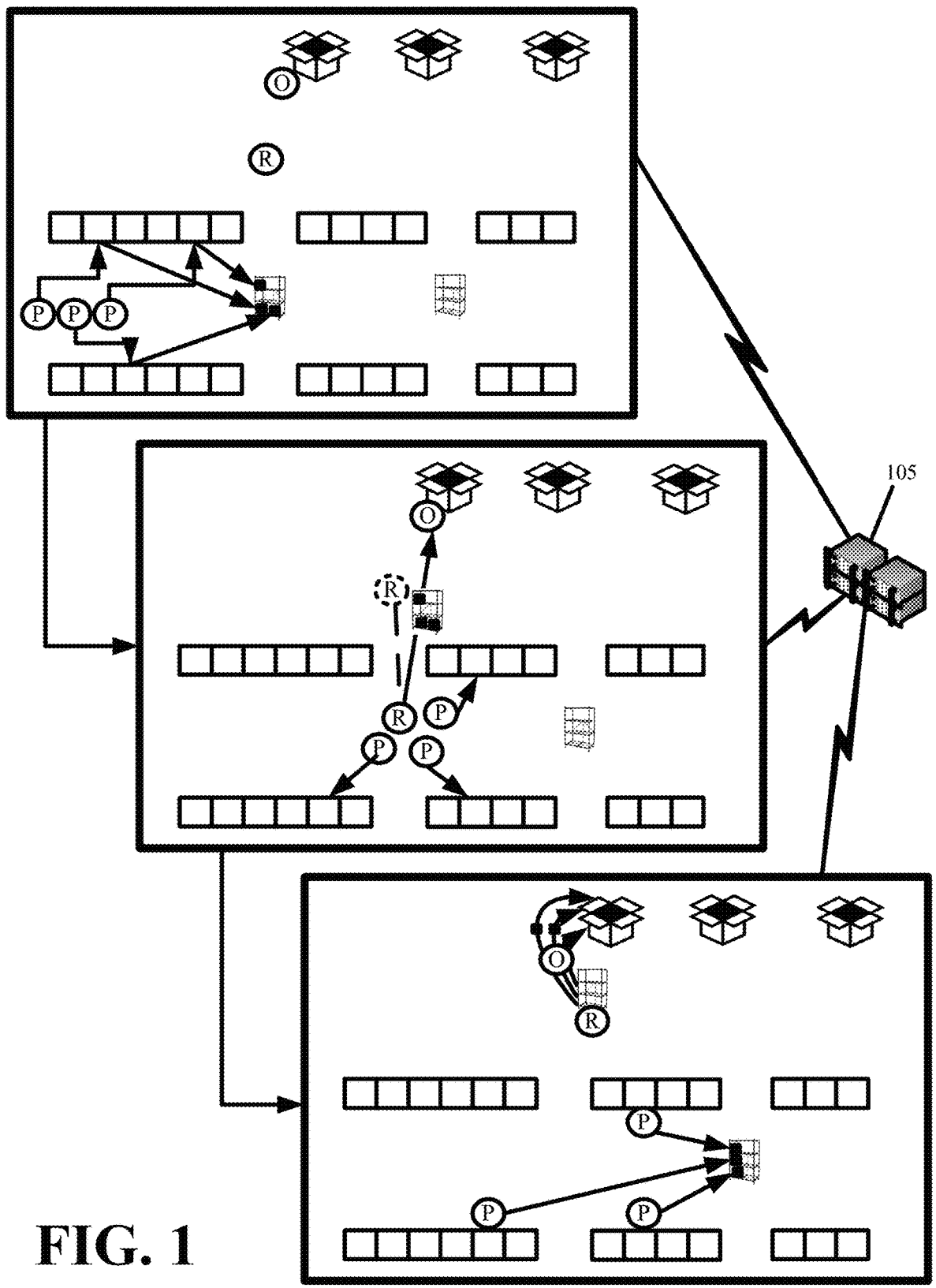
FIG. 1 illustrates the WMS directing execution of a pick-to-cart workflow by monitoring, coordinating, and controlling different agents and assets in accordance with some embodiments.

A workflow management system (WMS) is provided to optimize performance of different workflows occurring within a business or at a location such as a warehouse or a distribution center. The WMS optimizes workflow execution by minimizing overall execution time and maximizing execution efficiency through reduced resource usage and cost.

The WMS optimizes workflow performance by monitoring, coordinating, and controlling the agents and assets involved in the workflow execution. Coordination and control includes the WMS assigning tasks that direct agent movements and operations relative to one another. Monitoring includes the WMS receiving sensory and other feedback from the agents.

The agents integrated as part of the WMS and the workflow execution under WMS monitoring, coordination, and control include humans and robots. The assets include resources used by the agents as part of the workflow execution. Different workflows involve different combinations of these agents and assets. For instance, the WMS may monitor, coordinate, and control robots and resource assets in performance of a first workflow, monitor, coordinate, and control humans and resource assets in performance of a second workflow, and monitor, coordinate, and control robots, humans, and resource assets in performance of a third workflow.

WMS human agents are human workers. The human workers perform different tasks associated with one or more workflows based on task assignments and other instruction communicated from the WMS to the human workers. In preferred embodiments, the WMS communications are passed to assets, such as network enabled devices, accessed by the human workers. Each network enabled device has wired or wireless connectivity to the WMS. The network enabled device can be a mobile device carried by the human worker. The mobile device can be a smartphone, tablet, or other special purposed device. The WMS can monitor, communicate, and coordinate the human worker via the mobile device. The network enabled device can also be a stationary device, such as a desktop computer, located at a station or area where one or more human workers perform tasks assigned by the WMS.

WMS robot agents refer to autonomous machines that the WMS leverages in performing different tasks associated with one or more workflows. The robots include at least one transceiver and receiver for communicating with the WMS. The robots can be stationary or mobile, wherein mobile robots include a means of locomotion whether aerial (i.e., flight) or land based (i.e., wheeled). The robots include sensors to monitor their surroundings and detect objects and obstacles therein. Some robots further include functionality with which to interact with and manipulate their surroundings and objects therein. For instance, mobile robots and stationary robots may include robotic arms, cranes, or other mechanical means with which to physically interact with their surroundings. The WMS can simultaneously integrate with different sets of robots for performance of different tasks. For example, the WMS can integrate with a first set of item picking robots and a second set of item retrieval robots. In this example, the item picking robots are specialized for picking items from shelves or other locations, while the item retrieval robots are specialized for transferring multiple items picked by the item picking robots to a different location. U.S. Pat. No. 9,120,622 entitled "Autonomous Order Fulfillment and Inventory Control Robots" provides examples of some robot assets that can be integrated as part of the WMS of some embodiments. The contents of U.S. Pat. No. 9,120,622 are incorporated herein by reference.

The human agents and robot agents may consume or access different resource assets in performing different WMS assigned tasks. Accordingly, the WMS also monitors, coordinates, and controls the resource assets to ensure that the agents have proper access to the resources when they are needed to ensure timely completion of assigned tasks. The resource assets can include three-dimensional space, processing power, battery power, bins, boxes, authorized access, and other elements that the agents access or consume in performing different tasks assigned to them by the WMS.

In some embodiments, the WMS integrates with third-party systems or supplemental systems including, for example, ordering systems or inventory databases. An integrated ordering system initiates one or more WMS workflows by feeding customer orders to the WMS. The WMS then coordinates and controls the agents and asset allocation in fulfilling the customer orders in an optimal manner. The same workflows can also be triggered through manual entry of customer orders to the WMS. In some embodiments, the inventory database integrates with the WMS to facilitate the order fulfillment by providing the WMS with a real-time quantity of ordered items as well as their locations within a distribution site. The WMS can also integrate with the inventory database to update inventory counts by reducing counts for items depleted as a result of fulfilling customer orders and by increasing counts for items replenished as a result of the WMS leveraging the agents to restock the distribution site based on incoming shipments.

As noted above, the WMS coordinates and controls the agents and assets in performance of different workflows through an optimized assignment of tasks across the agents. More specifically, the WMS distributes tasks across the agents at different times such that the task and overall workflow execution time is minimized, the conflicts and waiting times amongst the agents and assets are minimized, and the overall cost associated with agent and asset usage and consumption is minimized.

The granularity of the assigned tasks varies depending on the level of monitoring, coordination, and control the WMS has over the agents and assets. The WMS is able to optimize more aspects of a workflow as the task granularity increases. For instance, the WMS can perform a first optimization by assigning a first task to a first robot and a second task to a second robot by monitoring the robot positions and determining that the first robot can complete the first task more efficiently than the second robot based on their monitored positions. In this instance, the WMS defers to the first and second robots for how they go about executing the first and second tasks respectively after assignment. With additional granularity in the task assignment, the WMS can further optimize the execution of the first and second tasks. For instance, the WMS can plot a first path for the first robot to traverse and assign other sub-tasks for the first robot to perform as part of assigning the first task to the first robot. In this instance, the WMS controls the exact steps performed by the first robot in completing the first task. The additional granularity can also provide the WMS control over certain assets including sensors or actuators of the robot. For instance, the WMS can interface directly with motors of a robot to reposition the robot. The WMS then interfaces with a camera or other sensor of the robot to detect the position of an item about a shelf before interfacing with an actuator of the robot to control picking of the item with the actuator. Although these examples involve assignment of tasks to robots, the WMS can perform similar granular task assignments to human agents. For instance, the WMS can interface with a camera on a device carried by a human to monitor the human's actions before assigning tasks that direct the human to perform supplemental tasks. In this manner, the workflow automation and control provided by the WMS can therefore swap usage of human and robot agents.

Through the granular task assignment, the WMS can also assign human and robot agents access to different resources assets at designated times. For instance, in assigning a task involving plotting a path for a robot to traverse, the WMS can reserve the space along the path (i.e., resource asset) for the robot so that other robots or humans will not enter the path or create an obstacle for the robot during its traversal of the path.

In some embodiments, the WMS workflow optimization involves failover control and coordination. After assigning a task to an agent, the WMS can monitor completion of the task by the agent. Should the agent not complete the task in an expected interval because of failures, obstructions, or other issues, the WMS can failover and assign the task to another agent. The WMS can also allocate additional assets or redefine the task more granularly to better guide the agent in completing the task. For example, if a human agent has difficulty locating an item in a distribution site, the WMS can allocate image processing resources to assist the human in finding the item location in the distribution site, wherein the image processing resources supplement a camera or other imaging means on a mobile device carried by the human.

In some embodiments, the WMS quantifies the optimizations by tracking performance of the assigned tasks. The WMS monitors time to completion after each task is assigned. The WMS can derive performance metrics from the monitoring and provide a dashboard with which an administrator can track workflow execution and efficiency. The WMS can determine if a baseline or expected level of performance is being met based on the task monitoring. The WMS can also determine if the task assignment improved overall workflow performance relative to prior assignments or prior workflow runs. The quantifications or monitoring can be more granularly defined depending on the workflow being performed. For instance, in a distribution site in which the workflow involves fulfilling a customer order by retrieving items, the average amount of time to retrieve an item based on WMS assigned tasks can be compared to the average retrieval time realized without the WMS. As another example, the WMS can track the average item retrieval time using five robot agents versus five human agents in order to determine if robot usage is more efficient and cost effective than using humans for the same tasks. Such quantifications can account for external factors including robot deployment costs, human salaries, robot runtime, retrieval error rates, etc.

In some embodiments, the WMS simulates task performance based on monitored or tracked real-world performance parameters of the robot agents and/or human agents. The simulation involves assigning tasks across a virtual set of agents and then executing the tasks in the virtual environment albeit with the same real-world constraints facing a mirrored set of actual agents and with the same limited asset availability. The constraints include modeling the site in which the tasks are to be performed. The constraints further model movements, operations, and timings of the virtual agents to mirror those of the actual human and robot agents in performing the assigned tasks. For instance, the WMS may have monitored the average time for a robot agent to move a certain distance, raise to a certain height, and retrieve an item of a specific size. These monitored values are then used to simulate task performance in the virtual environment. As with real-world assets, the WMS monitors performance of the tasks by the virtual agents. The WMS quantifies the task performance based on the monitored performance. The WMS can then identify an optimal allocation of resources or assets for a given workflow without actual execution of the tasks with different actual resource deployments. A specific example involves simulating item retrieval based on actual customer orders and based on a virtual mapping of the distribution site in order to identify the most cost effective deployment of human and/or robot agents and asset allocation that results in the most efficient execution of the tasks. In other words, the WMS simulation can identify if the distribution site needs one, two, three, or more robots in order to keep up with the order rate experienced by the distribution site. In some embodiments, the WMS provides a visualization of the simulation in real-time or accelerated real-time. The simulation can also compute a return-on-investment if the distribution site was to deploy the WMS. The WMS can simulate and accurately compute the cost-per-task and compare that with existing costs, thereby demonstrating the cost savings that the WMS can provide.

The figures below illustrate preferred embodiments with which the WMS monitors, coordinates, and controls agents and assets in optimizing workflow performance. FIG. 1 illustrates the WMS directing execution of a pick-to-cart workflow by monitoring, coordinating, and controlling different agents and assets in accordance with some embodiments.

The pick-to-cart workflow of FIG. 1 involves the WMS 105 monitoring, coordinating, and controlling a first set of agents in picking items associated with one or more customer orders and placing those items in different carts, a second set of agents in retrieving each particular cart once some or all items associated with the customer orders designated to the cart have been picked and placed to the cart, and leveraging either the second set of agents or a third set of agents to fulfill the customer orders by packaging the correct items for the orders, wherein the carts represent assets that the WMS 105 allocates to the different agents during the workflow execution.

FIG. 1 identifies the first set of item picking agents with the encircled letter "P" reference marker, the second set of item retrieval agents with the encircled letter "R" reference marker, and the third set of order packaging agents with the encircled letter "O" reference marker. The first, second, and third set of agents can include any mix of human agents and robots agents.

In coordinating and controlling the first set of agents, the WMS 105 assigns tasks to the first set of agents that include directing different agents of the first set of agents to the storage locations of one or more items within a distribution site, wherein the storage locations represent assets and the WMS 105 authorizes when each agent is permitted to access each asset. The storage locations can be within shelving or racks storing a multitude of items, on a stacked palette with different item palettes nearby, or in a storage container or bin with a quantity of the same or different items as some examples. The WMS 105 identifies the items that the first set of agents are to pick once at the storage locations and coordinates and controls the first set of agents in removing the items from their storage location, navigating to a correct retrieval cart, and relocating the picked item to the retrieval cart. Each cart also represents a resource asset that the WMS 105 designates for items of a particular customer order. In other words, the WMS 105 permits agents picking items for the particular customer order access to the cart designated for the particular customer order while preventing agents picking items for other customer orders from accessing the designated cart. The WMS 105 can also allocate a particular cart to agents retrieving items of two or more customer orders. For example, items of a first customer order may consume a small portion of the overall cart space. Therefore, the WMS 105 may allocate the same cart resource for picked items of at least one other customer order.

The WMS 105 monitors the carts (i.e., assets) to determine when different sets of items have been picked and placed to the correct carts. After identifying a completed cart, the WMS 105 coordinates and controls relocation of the completed cart to an order fulfillment station by an agent from the second set of agents. In particular, the WMS authorizes the agent from the second set of agents to access the completed cart (while preventing other agents from doing so) and assigns tasks that direct the agent to the completed cart. The WMS 105 monitors the agent's movements to verify that the agents arrives at the correct cart. The WMS 105 then assigns tasks that direct the agents to relocate the cart to the order fulfillment station as another asset that the WMS 105 allocates for the next stage of the order fulfillment pick-to-cart workflow. More granular tasks can provide a first traversal path that leads the agent to the cart and a second traversal path with which the agent transfers the cart to the order fulfillment destination.

The order packaging tasks can commence upon retrieval of a cart to an order fulfillment destination. The WMS 105 coordinates and controls the packaging of items from the cart that are part of the same customer by identifying the items and quantity of items for each order and by directing an order packaging agent in packaging the identified items in the identified quantities. The WMS 105 further monitors that the customer order is correctly packaged. An optimization related to the grouping can include fulfilling customer orders by maximizing the number of picked items that fit in a smallest possible package, box, or shipping container, thereby reducing the resource asset for shipping customer orders.

Figure 2:
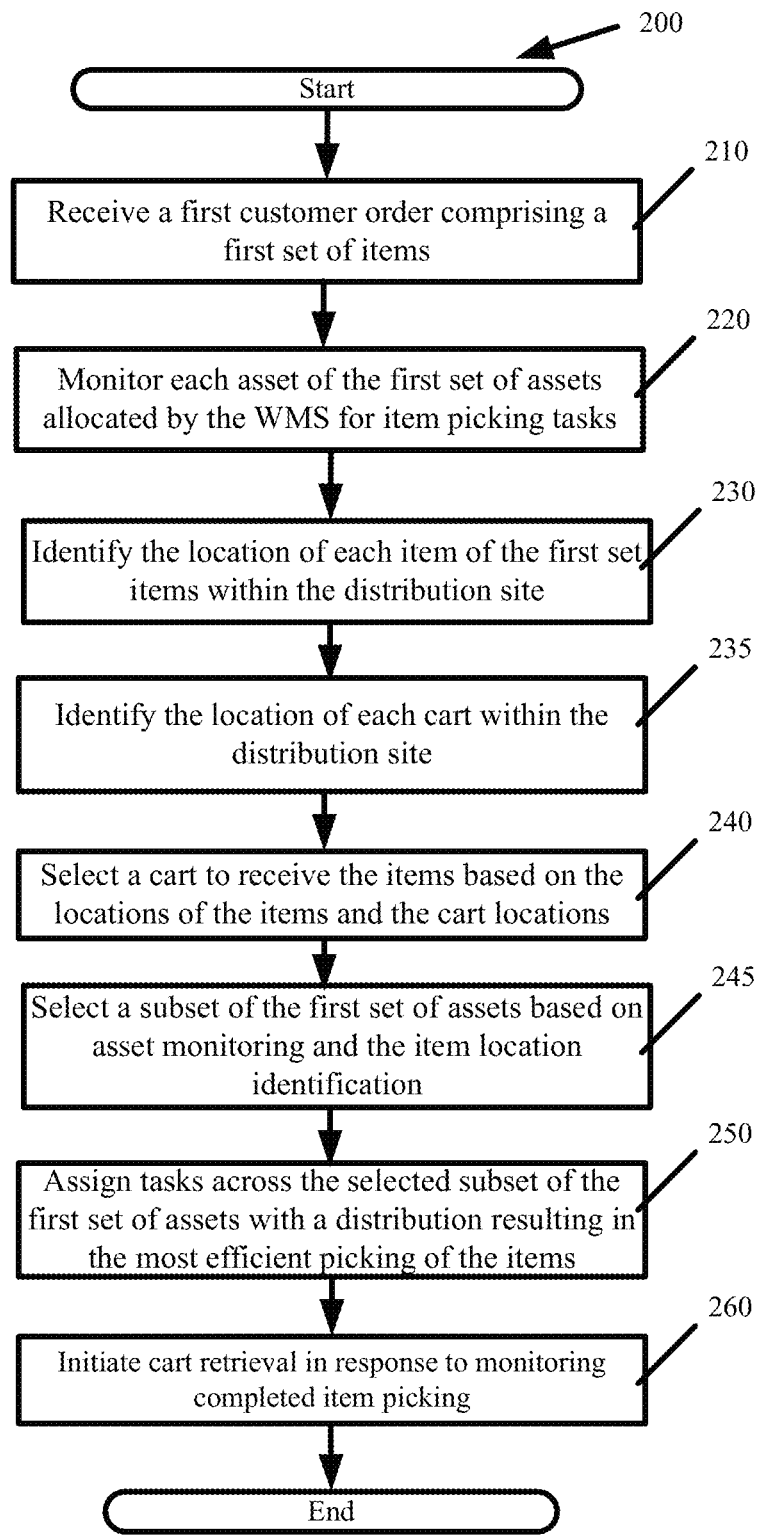
FIG. 2 presents a process by which the WMS optimizes the item picking tasks of the pick-to-cart workflow in accordance with some embodiments.

FIG. 2 presents a process 200 by which the WMS optimizes the item picking tasks of the pick-to-cart workflow. Here, the optimization involves the WMS monitoring, coordinating, and controlling task assignment across the first set of item picking agents in order to maximize the number of items that are picked in the shortest amount of time using the fewest number of agents from the first set of agents. To do so, the WMS assigns tasks across the first set of agents in a manner that minimizes asset conflicts as well as travel distance as the agents go about picking items and relocating the picked items to the different carts. Minimizing asset conflicts involves minimizing different agents accessing the same space at the same time and minimizing the amount of time one agent waits to complete a task because another agent is performing the same or similar task.

The process 200 commences in response to the WMS receiving (at 210) a first customer order comprising a first set of items. As noted above, the WMS can integrate with a third party ordering system in order to receive the first set of items. The first set of items can also be received through manual entry, a database, or an internal ordering system. In some embodiments, the receiving step occurs at regular intervals. In some other embodiments, the receiving step occurs whenever a new order identifying one or more items for picking is received.

The process monitors (at 220) each agent of the first set of agents allocated by the WMS for item picking tasks. The monitoring at step 220 may involve the WMS monitoring the position of each agent of the first set of agents. As noted with reference to FIG. 1, the first set of agents can include one or more item picking human workers or robots. The WMS can continually monitor the position of the agents so that the WMS tracks the agent positions at all times. The monitoring is based on wireless messaging exchanged between the WMS and the agents. The monitoring at step 220 may also involve monitoring availability of each agent of the first set of item picking agents. Since the WMS assigns tasks to the agents, the WMS knows how many tasks each agent is performing at any given time. The WMS can determine when individual tasks are completed by monitoring the agent movements or by messaging from the agents. Thus, an available agent can be one that is not currently assigned or performing any tasks, is assigned the fewest number of tasks, or is expected to complete assigned tasks before other agents based on location and complexity of the task.

The process identifies (at 230) the location of each item of the first set items within the distribution site. The items can be considered resource assets that the WMS monitors and also coordinates and controls access to. The item location identification is based on a mapping of item placements within the distribution site. In some embodiments, the WMS maintains such a mapping of all items within the distribution site.

The process also identifies (at 235) cart locations as these are yet another resource asset of the workflow. The carts may be placed in designated locations to allow the WMS to passively monitor their locations. Beacons or other transmitters may be placed on the carts or in locations where the carts are located to signal cart locations back to the WMS and thereby allow the WMS to actively monitor their locations. The WMS can also interface with cameras or other sensors carried by the agents or located throughout the distribution site in order to actively track the cart locations.

The process selects (at 240) a cart to which the items of the same customer order are to be retrieved based on the locations of the items identified at 230 and the cart locations identified at 235. The WMS selects the cart that has sufficient storage availability for the items of the customer order and is closest to those items, thereby reducing the total distance for relocating the items to the cart. In the event that the item locations are sufficiently scattered about the distribution site, the WMS may select two or more carts and assign retrieval of different subsets of the set items to each cart.

The process then selects (at 245) a subset of the first set of agents for efficient picking of the first set of items as determined from the agent monitoring at 220 and the item location identification at 230. The agent selection is based on which agents from the first set of agents can pick the first set of items in the least amount of time, wherein the timing accounts for asset availability, distance of each agent from each of the first set of items and the selected cart, and asset conflicts arising between agents picking the first set of items and other items associated with previously assigned tasks as some examples.

In some embodiments, the WMS can also factor asset functionality, capabilities, and feature set as well as item attributes in selecting the agents at step 245. Accordingly, the selected subset of agents need not be a uniform set of agents. For example, the WMS may assign a large item retrieval robot agent to retrieve a first item that is large and heavy, and a human agent to retrieve a fragile small item. As another example, human agents may be better at picking small loose items, whereas robot agents may be better at picking items that are located above human reach. As yet another example, a first robot agent may be configured to retrieve vertically stacked items in a palette, whereas a second robot agent may be configured to retrieve horizontally stack items on a shelf.

The process assigns (at 250) tasks across the selected subset of the first set of agents with a distribution resulting in the most efficient picking of the first set of items. For example, the WMS identifies the selected item picking agent that is closest to an item and directs that agent in picking that item.

When the WMS coordination and control is at the highest granular level, the assigned tasks direct or instruct each agent of the selected subset of agents on the one or more items to retrieve and the item quantity to retrieve. At this level, the agents determine the individual steps to complete each assigned task including what assets are needed to pick the item, the path to arrive at the item location, the manner by which to identify the item from other items at the location, and the means with which to pick the item.

When the WMS coordination and control occurs at a lower granular level, the assigned tasks can direct or instruct each agent of the selected subset of agents of the individual steps with which to pick the items. At this level, the WMS assigned tasks can instruct an agent on the optimal path to the item location and also reserve the space resource assets needed to traverse the path, wherein the most optimal path is the fastest path to the item location as determined from distance to the item location and congestion along the path. The WMS can also identify the item to be retrieved for the agent by interfacing with cameras or other sensors of the agent assigned to pick the item and highlighting the item in a display or otherwise directing the agent's movements to the item location. The WMS can also control movement of an agent's retrieval arm in picking the item and in moving the picked item to a drop off location.

As noted above, the WMS monitors (at 260) the subset of the first set of agents to identify when all items have been or will be retrieved to a designated cart at which time the WMS initiates cart retrieval. In particular, the WMS coordinates an agent from the second set of agents to relocate the cart to an order fulfillment destination.

The WMS optimizes the cart retrieval tasks by minimizing the amount of time a completed cart is left waiting for relocation. The coordination and control for cart relocation is however complicated because of the bidirectional dependencies between the first set of agents performing item picking and the second set of agents performing cart retrieval. The second set of agents cannot complete the cart retrieval tasks until the first set of agents perform the item picking tasks. Accordingly, the WMS coordinates and controls the second set of cart retrieval agents based on monitored activity of the first set of item picking agents. In optimizing the cart retrieval tasks, the WMS monitors availability of the second set of agents as well as their distance from a completed cart. The WMS can also account for other factors such as agent abilities or functionalities. For example, a first completed cart may require relocation by a forklift and therefore requires an agent with ability to operate the forklift, whereas a second completed cart can be pushed by a human worker or robot.

To initiate cart retrieval, the WMS assigns a task that directs a cart retrieval agent in delivering a cart to a desired destination. More granular task assignment can include plotting the path to reach a completed cart and reserving exclusive access to the space along the path to the cart retrieval agent assigned with the task. The WMS monitors that the correct cart has been retrieved as a result of the cart retrieval agent scanning the cart or an identifier of the cart and the scan passing to the WMS. Alternatively, the WMS can interface with cameras or other sensors of the cart retrieval agent and access the cameras or other sensors to verify that the correct cart is retrieved. The WMS can then navigate the cart retrieval agent in delivering the cart to the correct destination, wherein another scan or interface to the cameras or other sensors allows the WMS to monitor that the cart was delivered to a desired order fulfillment station.

Upon delivery of the cart, the WMS coordinates and controls actions of an order packaging agent at the order fulfillment station. In particular, the WMS assigns order packaging tasks that guide the agent in correctly packaging the items on the retrieved cart.

Figure 3:
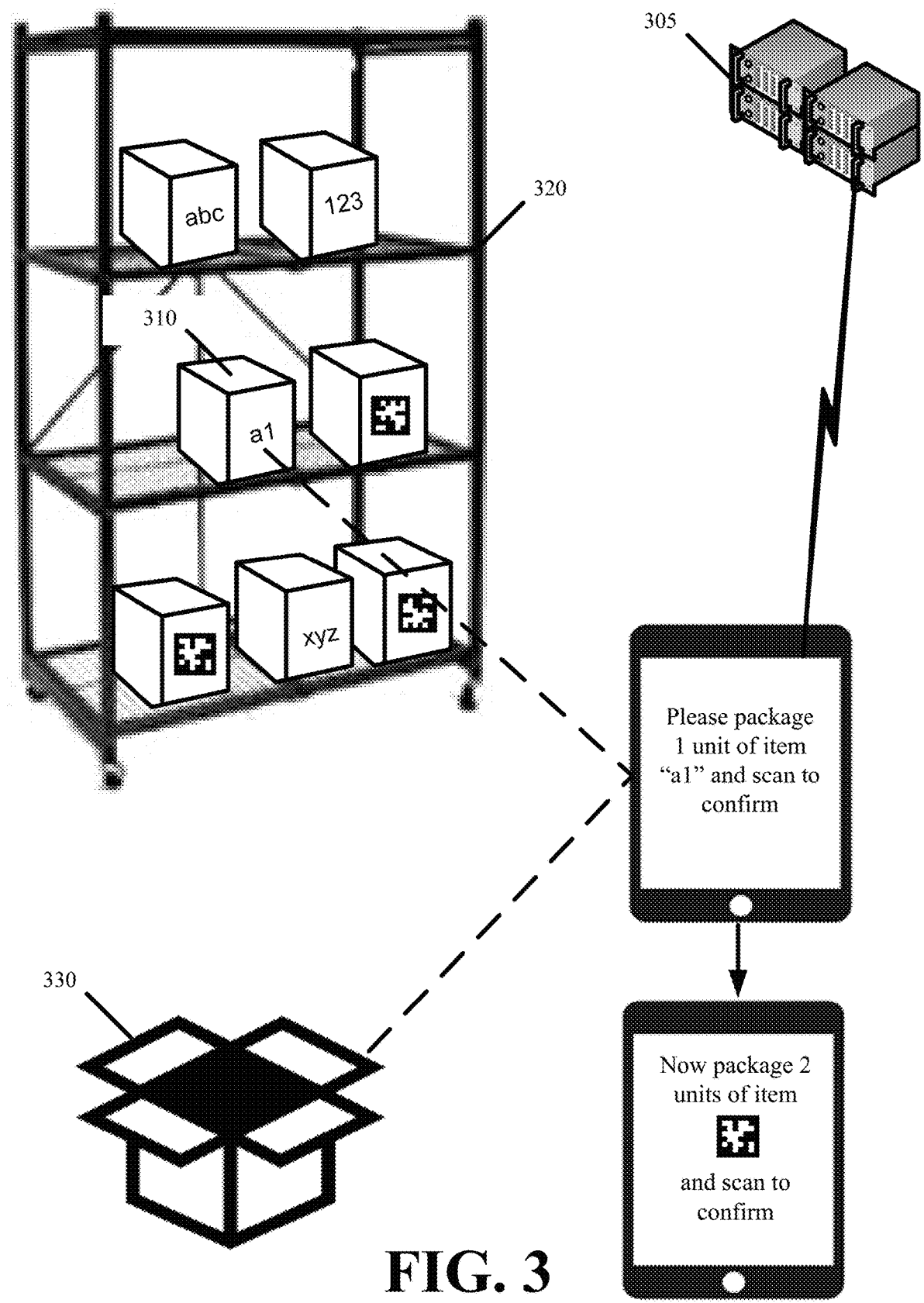
FIG. 3 conceptually illustrates the WMS optimizing the order packaging tasks of the pick-to-cart workflow in accordance with some embodiments.

FIG. 3 conceptually illustrates the WMS 305 optimizing the order packaging tasks of the workflow in accordance with some embodiments. The WMS 305 presents or highlights an item 310, and optionally a quantity of the item, that the agent is to retrieve from the cart 320 and place in a package 330. In some embodiments, the WMS 305 can interface with a camera or other sensor associated with the order packaging agent in order to directly identify the item. For instance, the WMS 305 can interface with a camera on a tablet or headset carried by a human agent or a camera of a robot agent. As shown in FIG. 3, the WMS 305 provides identification information about the item to the order packaging agent.

The WMS 305 monitors for completion of that task. In some embodiments, a scanner or other sensor communicates back to the WMS 305 and allows the WMS 305 to detect when the correct item has been removed from the cart 320 and placed in the package 330. For instance, the order packaging agent scans a barcode or takes an image of the packaged item and the scan or image passes to the WMS 305 for confirmation.

Upon completion, the WMS 305 then presents or highlights the next item from the cart 320 to be placed in the package 330. The agent continues packaging the order items in this fashion until all items associated with a particular order have been packaged.

The order packaging optimization provided by the WMS includes verifying accuracy of each package so that there are no omitted or misplaced items in the package. The WMS can further optimize the packaging by instructing the agent in how to most efficiently package the items based on the item dimensions and weight. Such optimizations reduce shipping and packaging costs, thereby minimizing asset consumption and cost.

Figure 4:
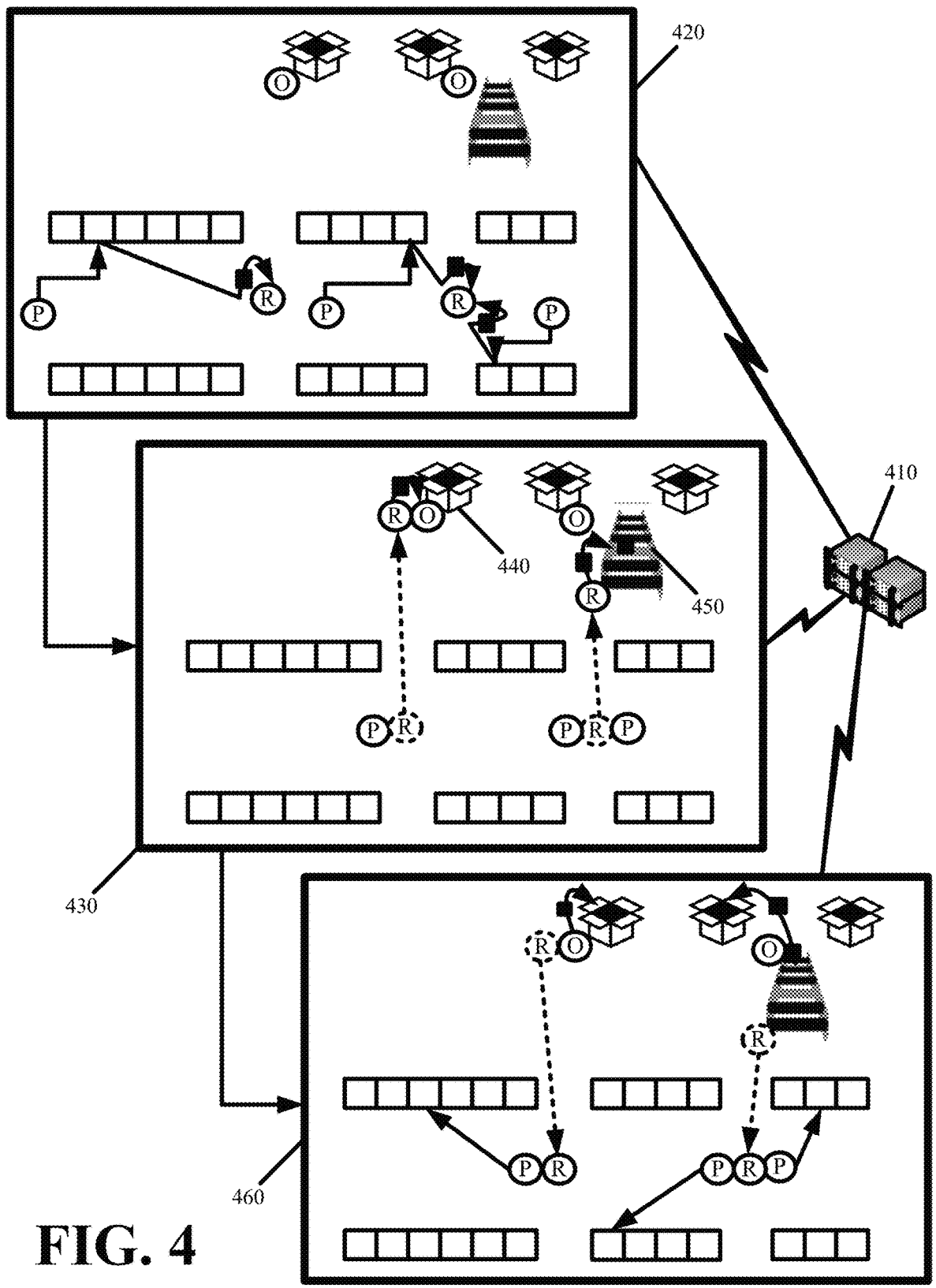
FIG. 4 illustrates the WMS directing execution of a pick-to-transit workflow by monitoring, coordinating, and controlling different agents and assets in accordance with some embodiments.

FIG. 4 illustrates the WMS 410 directing execution of a pick-to-transit workflow by monitoring, coordinating, and controlling different agents and assets in accordance with some embodiments. As with the workflow of FIG. 1, the WMS 410 coordinates and controls a first set of item picking agents identified by the encircled letter "P" reference markers, a second set of item retrieval agents identified by the encircled letter "R" reference markers, and a third set of order packaging agents identified by the encircled letter "O" reference markers.

The WMS 410 coordinates and controls the first set of item picking agents to pick items associated with one or more customer orders from different storage locations within a distribution site. The WMS 410 directs the first set of agents by assigning different item picking tasks to the agents. The assigned tasks can include identifying one or more items for each agent to pick with the agents determining the most efficient means with which to pick the items. At a more granular task definition, the WMS 410 can plot the path to each item that an agent is to pick, identify the location of the item in shelf, and even control mechanical functionality of the asset in picking one or more items. This part of the pick-to-transit workflow of FIG. 4 is similar to the pick-to-cart workflow of FIG. 1.

However, in the pick-to-transit workflow of FIG. 4, the WMS directs the item picking agents to directly transfer (at 420) the picked items to an item retrieval agent from the second set of agents rather than place the picked items in a cart. In particular, the WMS directs the item picking agents to travel to one or more item retrieval agents before transferring the picked items. In some other embodiments, the WMS directs the item retrieval agents to travel to the item picking agents before the picked items are transferred. In still some other embodiments, the WMS can coordinate and control an item retrieval agent during a single retrieval pass to retrieve multiple items of a single customer order or retrieve multiple items of different customer orders.

The WMS 410 then coordinates and controls the item retrieval agents in delivering (at 430) the picked items to one or more order packaging stations 440 or one or more conveyors 450 that lead to the one or more order packaging stations. The conveyors 450 allow items for customer orders to be queued. This permits the WMS 410 to use robot agents to perform the picking and retrieval at hours when human agents may not be present for order packaging. Upon return of the human agents, the orders will be awaiting packaging without further picking and retrieval delay. It should be noted that the conveyors 450, like the order packaging stations 440, are assets under WMS 410 control. In particular, the WMS 410 coordinates the times at which the item retrieval agents can access the conveyors 450 so as to minimize the wait times of the agents in dropping off items at the conveyors 450.

In some embodiments, the WMS 410 optimizes the transfer of items from the item retrieval agents to the one or more order packaging stations 440 or conveyors 450. The WMS 410 monitors the items that are retrieved by each item retrieval agent. More specifically, the WMS 410 monitors for the retrieval of items relating to different customer orders by a single item retrieval agent. In such cases, the WMS 410 optimizes the transfer of items by directing the item retrieval agent to deliver a first set of the retrieved items belonging to a first customer order to a first order packaging station or a first conveyor leading to the first order packaging station, and to deliver a different second set of the retrieved items belonging to a second customer order to a second order packaging station or a second conveyor leading to the second order packaging station. The item retrieval agent can also transfer different order items to the same order packaging station or conveyor by partitioning the transfer into different bundles or groups. For instance, the item retrieval agent can deposit a first set of items related to a first customer order in a first bundle at a conveyor, then move some distance down the conveyor and deposit a second set of items related to a second customer order.

The pick-to-transit workflow then involves the WMS 410 coordinating and controlling the third set of agents in efficiently packaging (at 460) the customer orders based on the items retrieved by the second set of agents. While coordinating and controlling the third set of agents in packaging the order with the retrieved items, the WMS 410 simultaneously directs the first set of agents in picking the next set of items and directs the second set of agents in returning to a location from which to retrieve the next set of items after picking by the first set of agents. The pick-to-transit therefore continues until all orders have been fulfilled.

Figure 5:
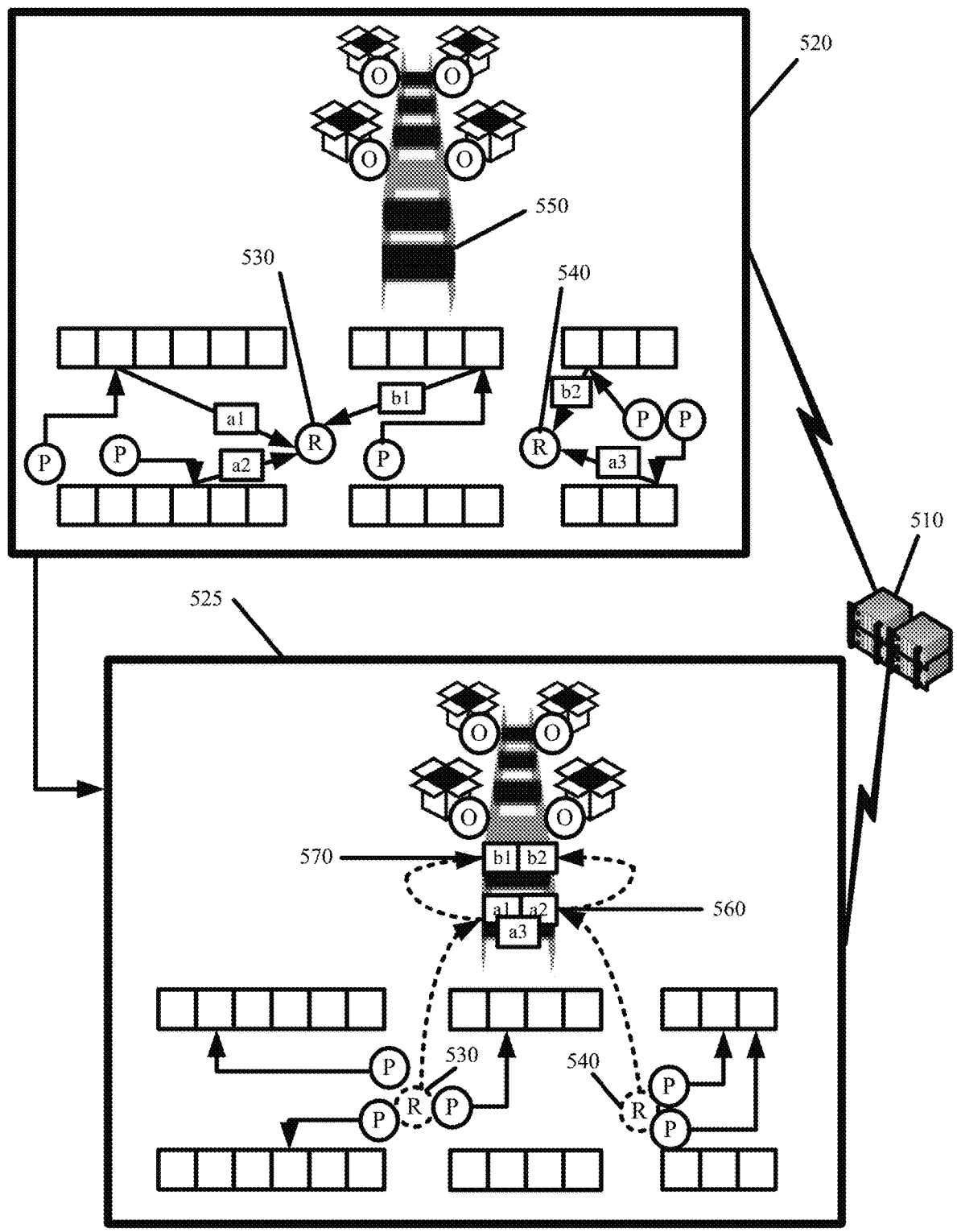
FIG. 5 illustrates the WMS optimizing the item retrieval steps of the pick-to-transit workflow through a distributed retrieval in accordance with some embodiments.

FIG. 5 illustrates the WMS 510 optimizing the item retrieval steps of the pick-to-transit workflow through a distributed retrieval in accordance with some embodiments. The distributed retrieval uses different item retrieval agents to group items of a common order together in order to simplify the packaging of the order.

The WMS 510 monitors (at 520) different order items retrieved by first and second item retrieval agents 530 and 540. From the monitoring at 520, the WMS 510 detects that the first item retrieval agent 530 has retrieved first and second items for a first customer order and a first item for a second customer order. The WMS 510 directs (at 525) the first item retrieval agent 530 to a first location 560 about a conveyor 550. The WMS 510 directs (at 525) the first item retrieval agent 530 to then deposit the first and second items of the first customer order at the first location 560. The WMS 510 directs (at 525) the first item retrieval agent 530 to a second location 570 further down the conveyor 550. A physical or virtual order separator may separate the first location 560 from the second location 570. The WMS 510 monitors the first item retrieval agent's 530 position and directs (at 525) the first item retrieval agent 530 to deposit the first item of the second customer order at the second location 570.

From the monitoring at 520, the WMS 510 also detects that the second item retrieval agent 540 has retrieved a third item related to the first customer order and a second item related to the second customer order. In similar fashion, the WMS 510 directs (at 525) the second item retrieval agent 540 to deposit the third item of the first customer order at the first location 560 about the conveyor 550 and the second item of the second customer order at the second location 570 about the conveyor 550. In some embodiments, the WMS 510 controls the conveyor 550 as a resource asset or coordinates an order packaging agent to control the conveyor 550. In particular, the WMS 510 operates the conveyor 550 so that the first bundle of items at the first location 560 relating to the first customer order are transferred to a first order packaging station and the second bundle of items at the second location 570 are transferred to a second order packaging station.

This distributed retrieval of retrieved items saves time when packaging the orders. In particular, there is no time wasted in separating items for different orders when packaging the different orders. The same distributed retrieval can be used when the WMS coordinates and controls the item retrieval agents in delivering retrieved items directly to order packaging stations instead of the conveyor. In other words, the WMS directs the item retrieval agents to the order packaging station where customer orders including items retrieved by the agents are being packaged. In some embodiments, the WMS instructs an item retrieval agent to make several stops when the agent retrieves items for different orders that are being packaged at different order packaging stations.

As noted above, the WMS may perform different optimizations to the item retrieval tasks assigned to the item retrieval agents in performance of the pick-to-transit workflow. One such optimization involves coordinating and controlling the item retrieval agents to move to the locations of the item picking agents in order to transfer a picked item rather than have the item picking agent move to the item retrieval agent.

Figure 6:
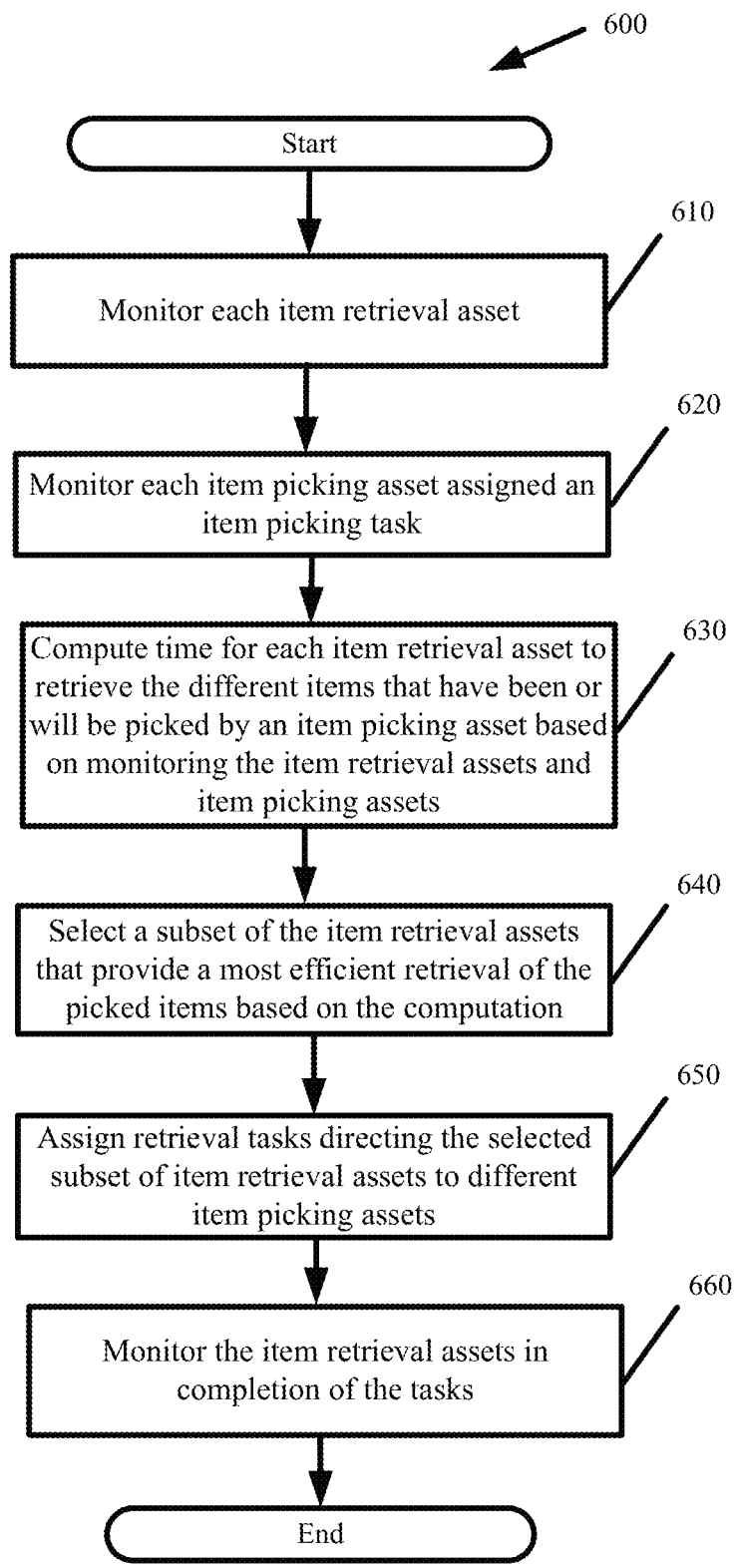
FIG. 6 presents a process by which the WMS optimizes the item retrieval tasks for the pick-to-transit workflow by directing the item retrieval agents to the item picking agents in accordance with some embodiments

FIG. 6 presents a process 600 by which the WMS optimizes the item retrieval tasks for the pick-to-transit workflow by directing the item retrieval agents to the item picking agents in accordance with some embodiments. Process 600 commences in response to or in parallel with assigning item picking tasks to the set of item picking agents. The process monitors (at 610) each of several item retrieval agents that are deployed within a distribution site or other operational center. As before, the WMS can monitor the position of each item retrieval agent as well as the availability of the item retrieval agents.

The process further monitors (at 620) each item picking agent assigned an item picking task. The WMS monitors the item picking agents to determine when different items will be picked and ready for retrieval.

Based on the monitoring at 610 and 620, the process computes (at 630) time for each item retrieval agent to retrieve the different items that have been or will be picked by an item picking agent. In some embodiments, the computation accounts for differing availability of each item retrieval agent, expected or actual time for item picking by the item picking agents, distance of each item retrieval agent from each retrieved item, and resource conflicts between item picking agents moving to pick next items and item retrieval agents moving to the item picking agents. When the item retrieval agents are not a uniform set of agents, the WMS also considers agent functionality in the computation at 630. For example, some agents may be configured or limited to retrieving large items while other agents may be configured or limited to retrieving small items.

The process selects (at 640) a subset of the item retrieval agents that provide a most efficient retrieval of the picked items based on the computation at 630. The process then assigns (at 650) retrieval tasks to the selected subset of item retrieval agents, wherein the assignment minimizes travel time for the selected subset of item retrieval agents to reach the item picking agents and further minimizes the total time that the item picking agents have to wait before transferring the picked items to the item retrieval agents.

Here again, the assignment can be performed with different task granularity. At the highest level, the WMS can instruct a selected item retrieval agent to retrieve a particular item from an item picking agent at the location of the item picking agent and to deliver the particular item to a destination. At more granular levels, the WMS can directly control or instruct the selected item retrieval agent with a plotted course to the location of the item picking agent, timing for when to traverse the plotted course, identification of a particular item to retrieve from the item picking agent, and a plotted course to the destination.

In some embodiments, the WMS further coordinates the item transfer by monitoring position of the item picking agent relative to the item retrieval agent. Once the agents have correctly oriented positions relative to one another, the WMS assigns a task that causes the item picking agent to transfer the picked item to the item retrieval agent. In some other embodiments, the agents communicate with one another such that the transfer of a picked item from the item picking agent to the item retrieval agent is initiated by and amongst the agents without further instruction by the WMS.

The process then monitors (at 660) the item retrieval agents in completion of the tasks. Should an error or failure arise preventing a first item retrieval agent from completing a retrieval task, the process can assign a different second item retrieval agent to complete the task. A successful transfer can be followed by tasks to retrieve a next item from another item picking agent or to deliver the one or more retrieved items to an order packaging station or conveyor.

Figure 7:
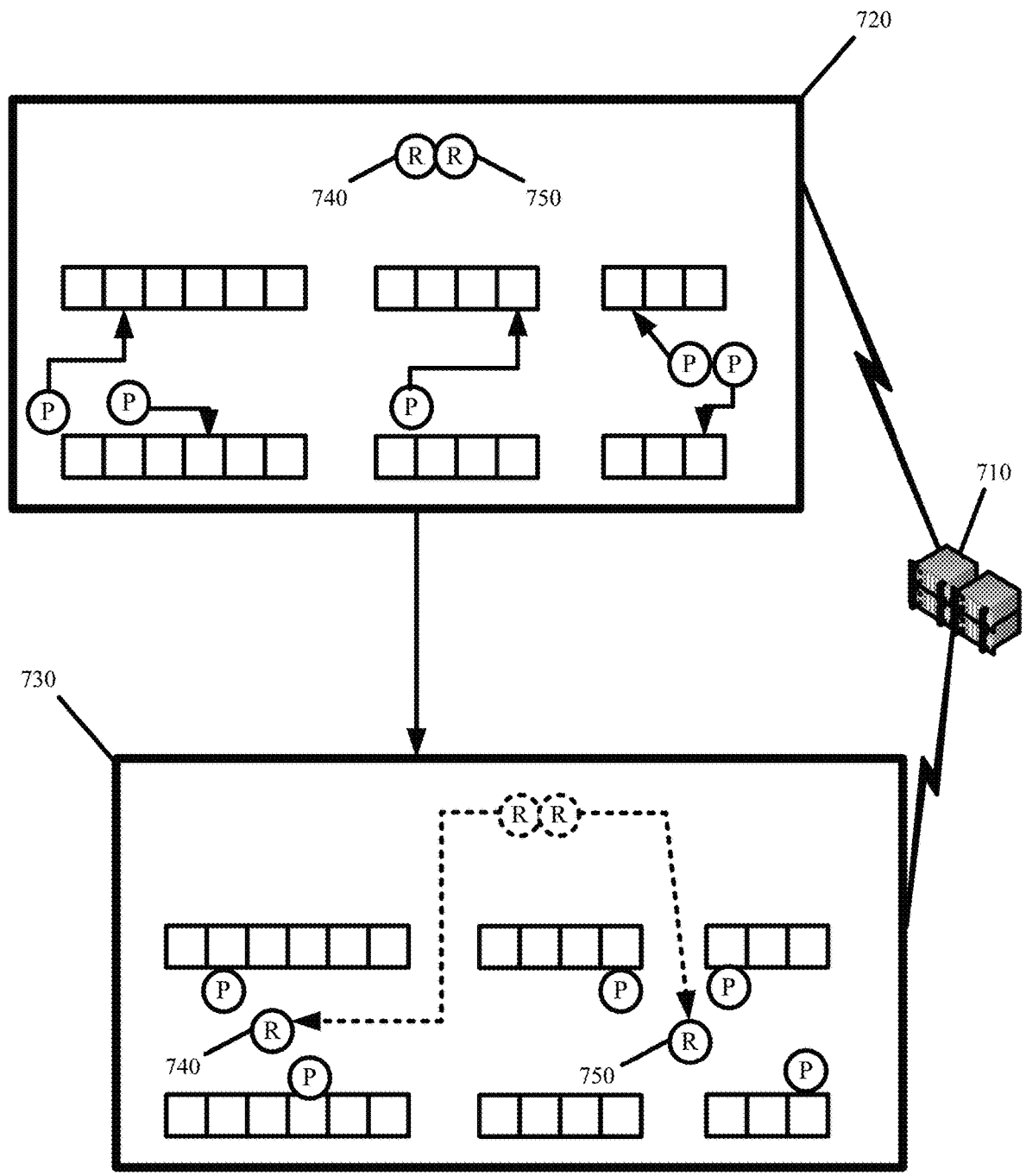
FIGS. 7 and 8 illustrate different WMS direction and control in optimizing the pick-to-transit workflow by maximizing the item pick rate in accordance with some embodiments.
Figure 8:
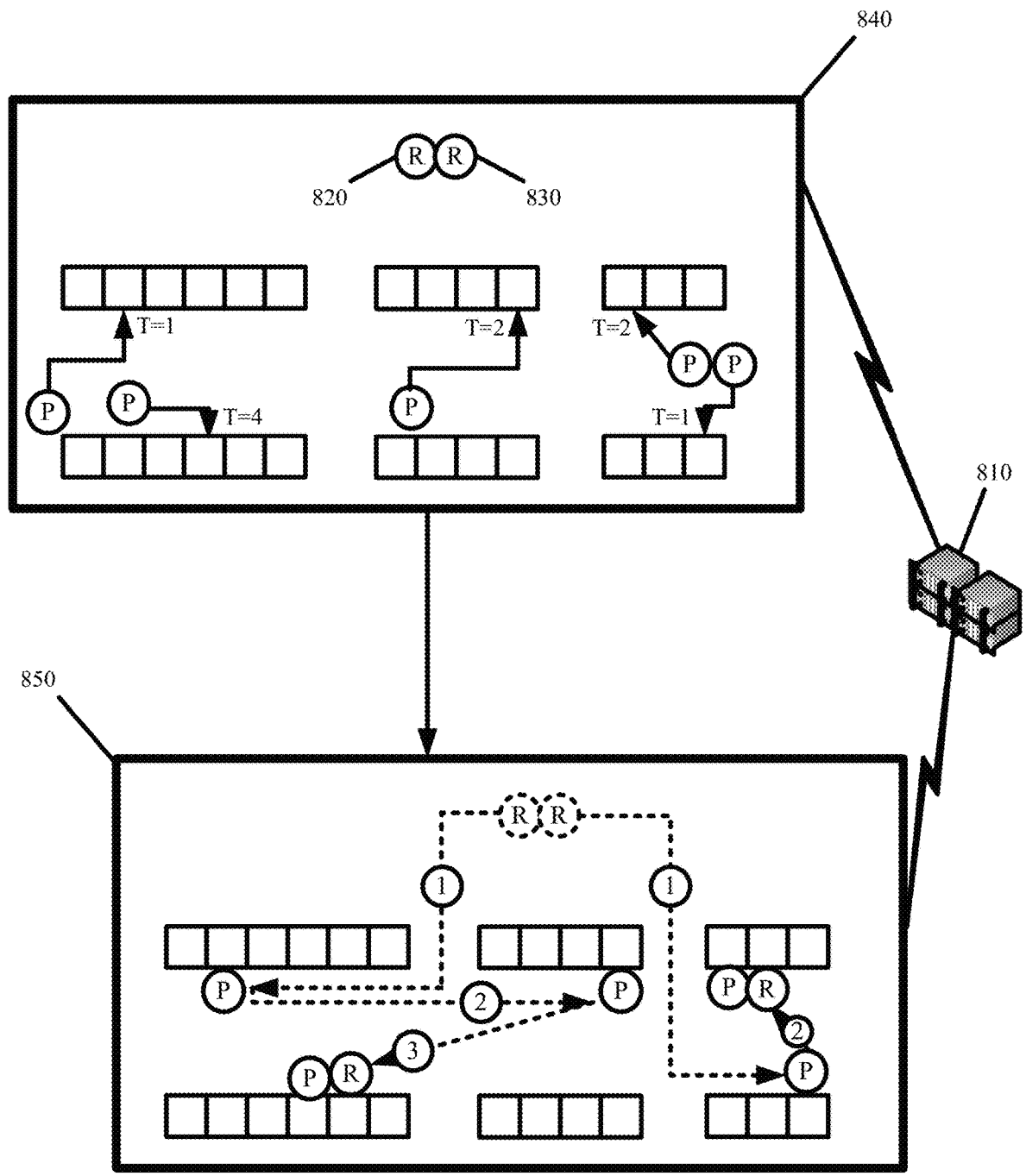

The WMS can further optimize the pick-to-transit workflow to maximize the item pick rate based on the WMS coordination and control of the item picking agents and the item retrieval agents. One manner with which the WMS can prioritize the item pick rate is by coordinating and controlling item picking agents to transfer picked items to the closest item retrieval agent regardless if items of other customer orders have also been transferred to the closest item retrieval agent. In other words, the WMS maximizes item pick rate by minimizing the distance the item picking robots of some embodiments travel in order to transfer picked items to an item retrieval robot of some embodiments. FIG. 7 illustrates the WMS maximizing the item pick rate of the pick-to-transit workflow with a first direction and control of the agents and FIG. 8 illustrates the WMS maximizing the item pick rate of the pick-to-transit workflow with a different second direction and control of the agents in accordance with some embodiments.

In FIG. 7, the WMS 710 monitors (at 720) the positioning of item picking agents. More specifically, the WMS 710 monitors the item picking tasks it assigns to the item picking agents and determines where the picking of each item will occur.

Based on the positioning of the item picking agents, the WMS 710 then computes optimal positioning for the item retrieval agents that will maximize the pick rate by reducing the total distance the item picking agents travel in order to transfer the picked items. Accordingly, the WMS 710 directs (at 730) a first item retrieval agent 740 to a position closest to a first set of item picking agents and further directs a second item retrieval agent 750 to a position closest to a second set of item picking agents. The WMS 710 then coordinates and controls each of the first set of item picking agents to transfer picked items to the first item retrieval agent 740 regardless of whether the picked items are for the same customer order or different customer orders. The WMS 710 provides similar direction or instruction to cause the second set of item picking agents to transfer picked items to the second item retrieval agent 750. The WMS 710 can further increase the item picking rate by controlling the item picking agents to only pick items from a single or nearby set of shelves.

The WMS 710 monitors which picked items the item picking agents transfer to the item retrieval agents 740 and 750. The WMS 710 maps the transferred items to different customer orders, and then determines the order packaging station at which each order is packaged. The WMS then instructs the item retrieval agents 740 and 750 to deliver the retrieved items to the one or more order packaging stations.

When delivering to a single order packaging station, the WMS instructs the item retrieval agent to wait at the order packaging station until all retrieved items have been scanned and placed with the correct order. The WMS coordinates and controls the order packaging agent by identifying which items retrieved by the item retrieval agent should be packaged with which order.

In some embodiments, the order packaging agent scans a first item delivered by the item retrieval agent. The WMS receives the scan, identifies the scanned first item, and instructs the order packaging agent on how to package that first item. The WMS continues coordinating and controlling the order packaging agent in this manner until all item retrieved by the item retrieval agent have been scanned and packaged.

Alternatively, the WMS can monitor arrival of the item retrieval agent at a first order packaging station. The WMS instructs the order packaging agent at the first order packaging station to package a first subset of the retrieved items that correspond to a first customer order from the item retrieval agent. In some embodiments, the WMS identifies each item of the first set of items to allow for the order packaging agent to remove those items from the item retrieval agent similar to the operation described with reference to FIG. 3 above. The WMS confirms removal and packaging of the correct item when the order packaging agent scans the item. Once the WMS monitors that all items from the first subset of items have been packaged, the WMS instructs the item retrieval agent to move to a second order packaging station. Again, the WMS monitors arrival of the item retrieval agent at the second order packaging station before instructing the order packaging agent at the second order packaging station to package a different second subset of the retrieved items that correspond to a second customer order from the item retrieval agent. The WMS coordinates and controls the item retrieval agent in this manner until all retrieved items have been packaged at the correct order packaging station. The WMS can then direct the item retrieval agent to retrieve additional items from the item picking agents.

In FIG. 8, the WMS 810 instructs two item retrieval agents 820 and 830 to move between different item picking agents as those agents pick different items. To maximize the pick rate, the WMS 810 determines the timing and sequence with which the item picking agents pick different items. The WMS 810 determines the pick timing and sequence based on where an item picking agent is when it is assigned an item picking task, where the item picking agent must travel to in order to pick the item, the time for the item picking agent to move to the pick destination, and the time for the item picking agent to pick the item. Based on the pick timing and sequence, the WMS 810 maximizes the item pick rate by assigning item retrieval tasks to the item retrieval agents 820 and 830 in an order that minimizes the amount of time the item picking agents wait before transferring a picked item.

840 presents the WMS 810 computed pick times for different items by the item picking agents. 850 then presents the ordered item retrieval tasks assigned by the WDM 810 to the item retrieval agents 820 and 830. As in FIG. 7, the item picking agents may transfer items of different customer orders to the same item retrieval agent. Consequently, when the item retrieval agent delivers the picked items to one or more order packaging stations, more time will be spent separating items for different orders than if the item retrieval agent only retrieved items for a single order.

Nevertheless, the WMS may perform the optimizations of FIG. 7 or 8 in order to prioritize the pick rate over order packaging when the average time to pick an item is longer than the average time to package an item. The WMS may also prioritize the pick rate when there are more order packaging agents than item picking agents.

In some embodiments, the WMS optimizes the pick-to-transit workflow to maximize item package rate over the item pick rate by coordinating and controlling item picking agents to transfer items related to the same customer order to the same item retrieval agent.

Figure 9:
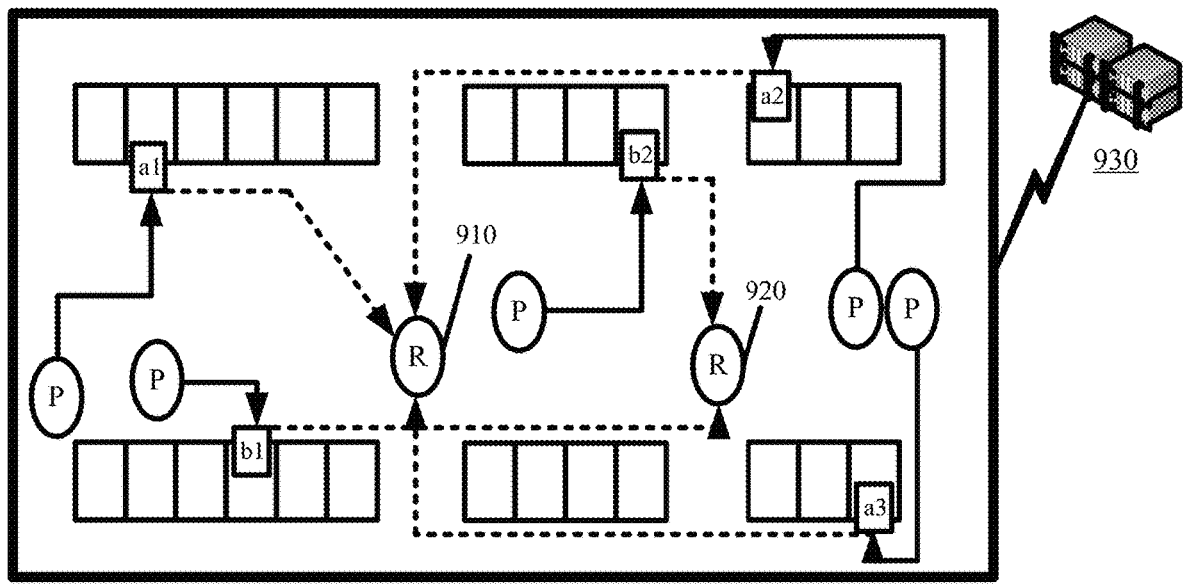
FIGS. 9 and 10 illustrate different WMS direction and control in optimizing the pick-to-transit workflow by maximizing the item packaging rate in accordance with some embodiments.
Figure 10:
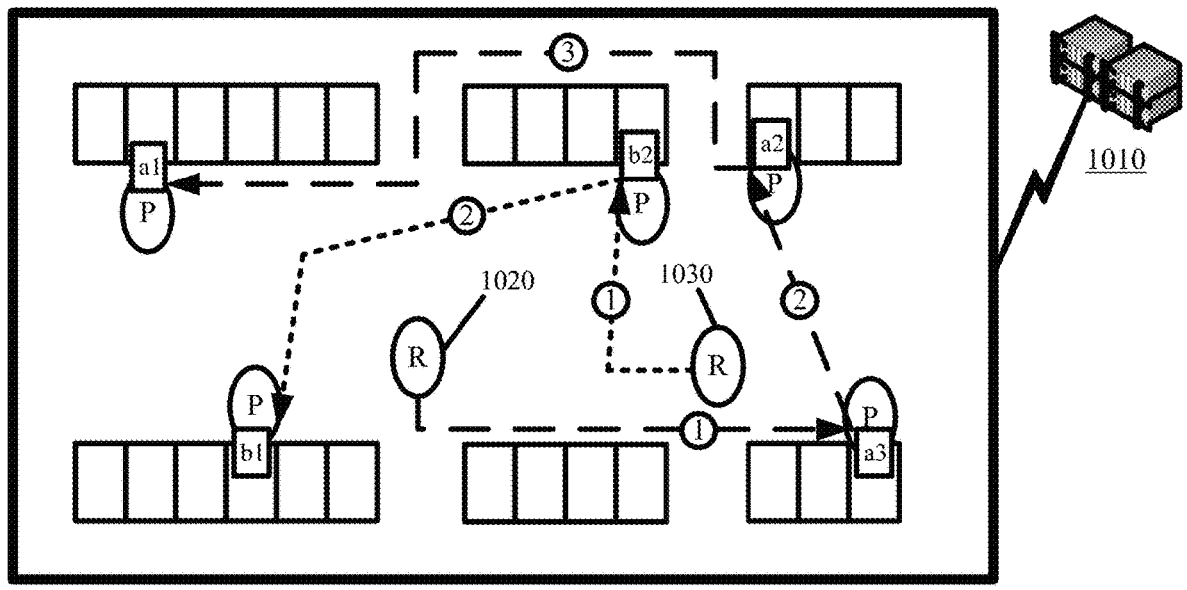

FIG. 9 illustrates the WMS maximizing the item packaging rate of the pick-to-transit workflow with a first direction and control of the agents and FIG. 10 illustrates the WMS maximizing the item package rate of the pick-to-transit workflow with a different second direction and control of the agents in accordance with some embodiments.

FIG. 9 illustrates two different item retrieval agents 910 and 920 and five item picking agents. The WMS 930 designates the first item retrieval agent 910 to accumulate items of a first customer order and the second item retrieval agent 920 to accumulate items of a second customer order. Due to the designation, the WMS 930 coordinates and controls each item picking agent to travel to the first item retrieval agent 910 after picking an item of the first customer order and to travel to the second item retrieval agent 920 after picking an item of the second customer order. The figure also illustrates paths the WMS 930 assigns to the item picking agents to coordinate movements of item picking agents so as to minimize obstacles when moving to transfer picked items to the item retrieval agents 910 and 920.

FIG. 10 is similar in that the WMS 1010 designates and controls the item retrieval agents 1020 and 1030 to accumulate only items of a single customer order. However, in FIG. 10, the item retrieval agents 1020 and 1030 move to the item picking assets after the item picking agents have picked an item for the customer order designated to the item retrieval agent 1020 or 1030. In FIG. 10, the WMS 1010 controls the item retrieval agents 1020 and 1030 to specify an optimal path with which each agent 1020 and 1030 retrieves the items from the item picking agents. The optimal path minimizes the potential for the item retrieval agents 1020 and 1030 from obstructing movement of other agents.

In either FIG. 9 and FIG. 10, once the WMS monitors that all items or a subset of items of a particular customer order have been accumulated by an item retrieval agent, the WMS assigns one or more tasks directing the item retrieval agent to deliver the items of the particular customer order to an order packaging destination. The WMS also coordinates and controls the order packaging agent at the order packaging destination to package each of the delivered items to the same customer order. The WMS monitors completion of the order package by receiving scans of each item that is packaged by the order packaging agent.

In some embodiments, two or more item retrieval agents may retrieve the items of a single order when the single order is too large for one item retrieval agent to retrieve or when it is more efficient to use two or more item retrieval agents. In some such embodiments, the WMS instructs the item retrieval agents to queue at the same order packaging station until all retrieved items from the item retrieval agents have been scanned and packaged. Thereafter, the WMS directs the item retrieval agents to retrieve additional customer order items from the item picking agents.

The optimizations to the pick-to-transit workflow provided by FIGS. 9 and 10 simplify and expedite the packaging of the customer orders as a result of the item retrieval agent delivering items of single order. The order packaging agents avoid time loss associated with identifying and separating items of different orders at the order packaging station.

Figure 11:
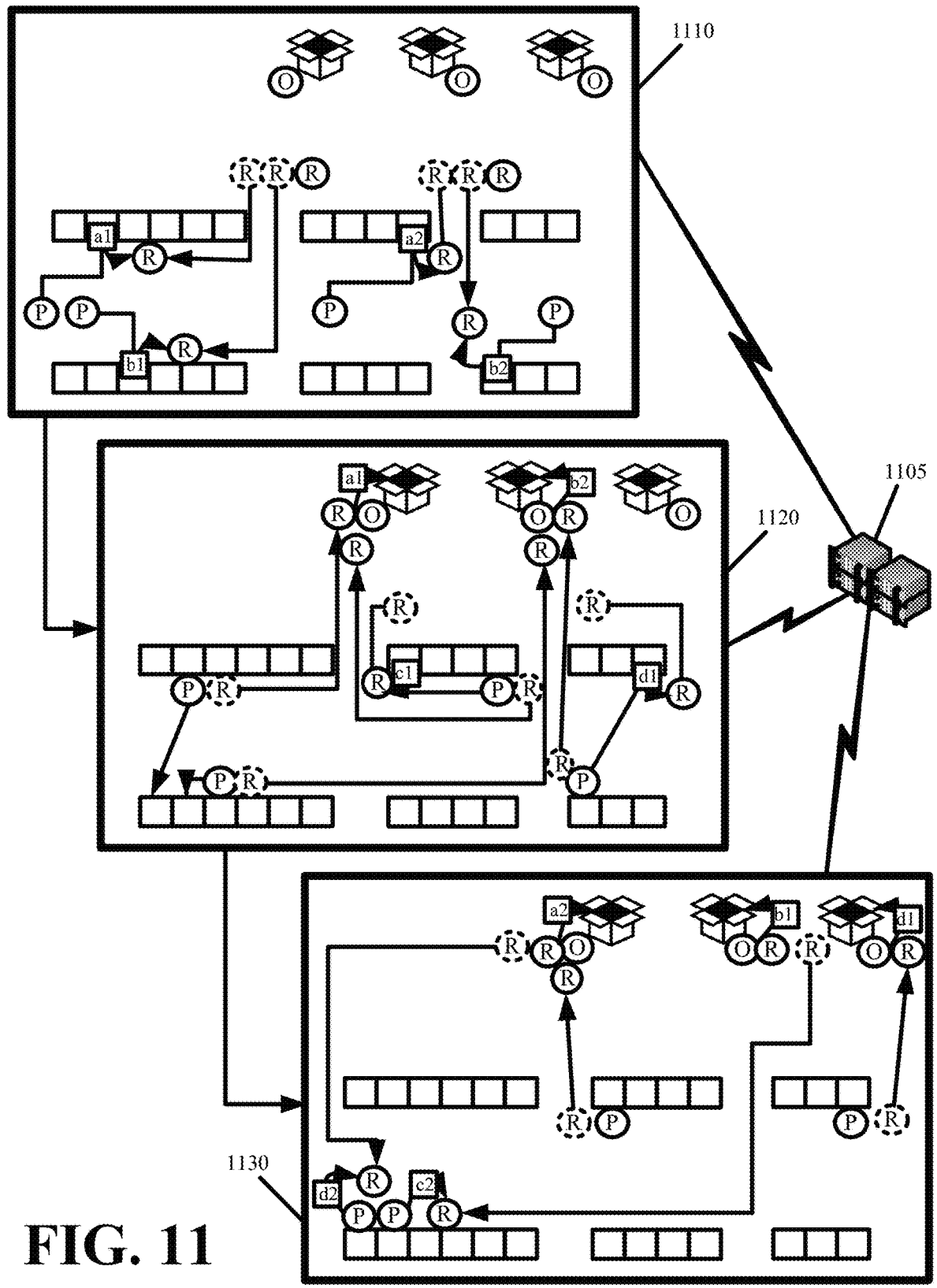
FIG. 11 illustrates WMS direction and control in optimizing the pick-to-transit workflow by maximizing the item pick rate and the item package rate in accordance with some embodiments.

The figures above involve workflow optimizations that prioritize item picking or item packaging. FIG. 11 illustrates WMS direction and control in optimizing the pick-to-transit workflow by maximizing the item pick rate and the item package rate in accordance with some embodiments. As before, FIG. 11 identifies the item picking agents with the encircled letter "P" reference markers, the item retrieval agents with the encircled letter "R" reference markers, and the order packaging agents with the encircled letter "O" reference markers.

At 1110 of FIG. 11, the WMS 1105 coordinates movements of the item retrieval agents with those of the item picking agents. In particular, the WMS 1105 directs the item retrieval agents to retrieve different picked items from the item picking agents as those items are picked.

At 1120 of FIG. 11, the WMS 1105 directs the item retrieval agents to deliver the retrieved items to the order packaging station designated for the order including that picked item. The item retrieval agents retrieving different items of the same customer order queue at an order packaging station while waiting for an order packaging agent to package the retrieved items from each item retrieval agent.

The WMS 1105 monitors the packaging at a station based on the order packaging agent scanning each item that is removed from a queued item retrieval agent. From the monitoring, the WMS identifies when all retrieved items from an item retrieval agent have been removed. At 1130 of FIG. 11, the WMS 1105 reassigns two item retrieval agents to retrieve additional picked items from item picking agents that have also been reassigned to pick additional items for customer orders.

In some embodiments, it is more efficient to perform a centralized picking of items rather than the distributed item picking presented in the above workflows. In some such embodiments, the WMS does not deploy the item picking agents to the item locations in order to pick the items. Instead, the WMS deploys a set of container retrieval agents to bring containers storing the items to the item picking agents.

This workflow is advantageous when the item picking agents are stationary or are slow in movements as compared to the container retrieval agents. For instance, a first set of robots may excel at picking items efficiently but may be very slow in moving from the storage location of a first item to the storage location of a second item, whereas a second set of robots may excel at moving containers from one location to another. In this environment, the WMS coordinates and controls the second set of robots to bring the containers to the first set of robots rather than have the first set of robots move from container to container to pick desired items and then have the second set of robots transfer the picked items to a packaging station. The workflow is also advantageous because the item picking can be performed in tandem with item packaging. The workflow for these embodiments is referred to as a retrieve-then-pick workflow.

Figure 12:
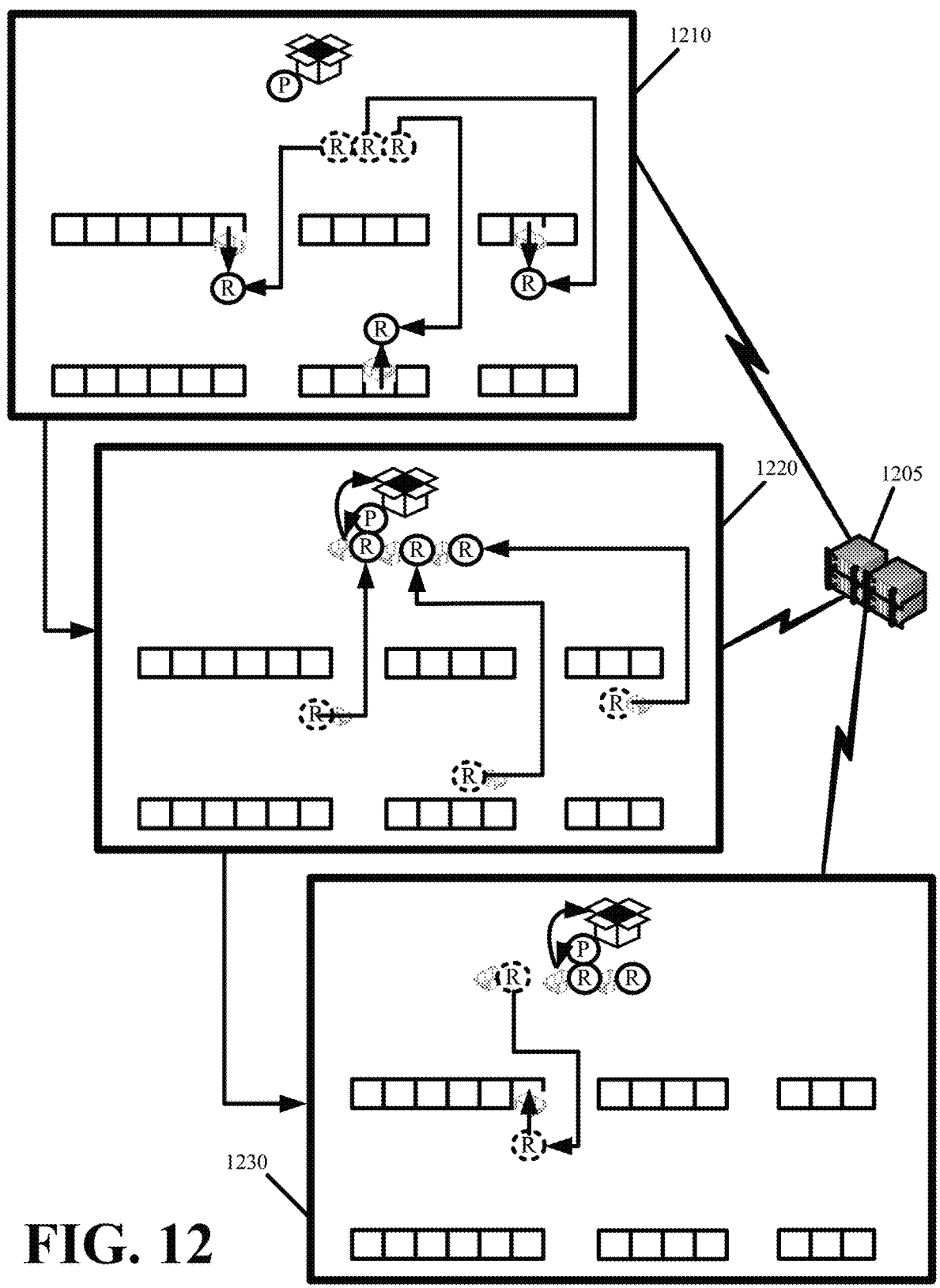
FIG. 12 illustrates the WMS directing execution of a retrieve-then-pick workflow by monitoring, coordinating, and controlling different agents and assets in accordance with some embodiments.

FIG. 12 illustrates the WMS 1205 directing execution of a retrieve-then-pick workflow by monitoring, coordinating, and controlling different agents in accordance with some embodiments. In FIG. 12, the container retrieval agents are identified with the encircled letter "R" reference markers and the item picking and packaging agents are identified with the encircled letter "P" reference markers.

The WMS 1205 executes the workflow by deploying (at 1210) a first set of container retrieval agents to retrieve bins, totes, boxes, or other containers that store one or more units of the same or different items needed to fulfill a customer order. In particular, the WMS 1205 receives a customer order. The WMS 1205 maps the items from the customer order to their corresponding storage locations within the distribution site. The WMS 1205 also tracks the locations of the available container retrieval agents. Based on the retrieval agent locations and the storage locations of the items, the WMS 1205 assigns retrieval tasks across the first set of container retrieval agents in a manner the produces a most efficient retrieval of the items. Specifically, the WMS 1205 provides each implicated container retrieval agent with the storage location of a container as well as identifying information about the container that is to be retrieved. As before, the WMS 1205 can provide identifiers or other visual identifiers about the container. The WMS 1205 can also access cameras or sensors of the container retrieval agent in order to directly identify the position of the container about a shelf or other arrangement. The WMS 1205 can also granularly specify the manner for retrieving the container. For instance, some containers may be pulled from a shelf while other containers may be stacked atop one another so that each container is removed by lifting the topmost container.

The WMS 1205 monitors that the correct container is retrieved based on the container retrieval agent scanning the container it retrieves and submitting the scan to the WMS 1205. From the scan, the WMS 1205 can track which containers are retrieved by which container retrieval agents. The WMS 1205 can alternatively access imaging or scanning hardware of the container retrieval agent in order to directly verify and control the container retrieval. For example, when a robot retrieval agent is positioned at a storage location of a desired container, the WMS 1205 accesses cameras or sensors of the robot retrieval agent in order to determine an exact position of the desired container before taking control and operating a robotic arm or other retrieval mechanism of the robot in retrieving the container.

The WMS 1205 assigned tasks also provide a destination for delivery of the container. In this figure, the WMS 1205 instructs the container retrieval agents to deliver the containers with items of a common customer order to the same order packaging station. Accordingly, the container retrieval agents enter (at 1220) into a queue at the order packaging station upon retrieval of different containers for the customer order.

At the order packaging station, the WMS 1205 tracks the container retrieval agent that is next or frontmost in the queue. More specifically, the WMS 1205 tracks the container retrieved by the agent that is next or frontmost in the retrieval queue. In some embodiments, the WMS 1205 associates a retrieved container with a container retrieval agent after the agent arrives at the storage location of the retrieved container and the WMS 1205 verifies the correct container is retrieved. In other words, once a container retrieval agent pulls a container from a shelf, the WMS 1205 tracks the container retrieved by that agent until the container is returned. In some other embodiments, the WMS 1205 detects the retrieved container based on a scan of the container provided by the container retrieval agent or the item picking agent when the container is next in the queue. The WMS 1205 queries the customer order that is being fulfilled to identify the particular item to be picked from the container and the quantity of the particular item to be picked.

The WMS 1205 then coordinates and controls one or more item picking agents at the order packaging station to fulfill the customer order by picking and packaging the appropriate quantities of ordered items from the retrieved container at the front of the queue. In some embodiments, the WMS 1205 provides the item picking agent with visual identifiers of the particular item, such as images, barcodes, graphics, etc.

In coordinating and controlling the item picking agent, the WMS 1205 monitors the quantity of the particular item retrieved from the container by the item picking agent. The item picking agent may scan or otherwise image each and every picked item so that the WMS 1205 can track the picking and also verify that the correct item in the correct quantity is picked. For example, a human worker scans each item picked from the container with the scan immediately transferring to the WMS 1205 for verification. Alternatively, the WMS 1205 can access cameras or other sensors at the order packaging station in order to directly detect each item that is picked from a container.

The WMS 1205 continually updates the coordination and control of the item picking agent based on the monitoring. In some embodiments, the WMS 1205 updates the instructions it sends to the item picking agent. In response to picking a correct item, the WMS 1205 can instruct the item picking agent on grouping or packaging the item with other items of the same order. The WMS 1205 can also update the count of remaining items to pick from the current container. Once the WMS 1205 has confirmed that the correct quantity of items from a particular container have been picked, the WMS 1205 directs (at 1230) the item retrieval agent to return the container to its original storage location within the distribution site or enter a queue at a different order packaging destination when the items within the retrieved container are specified as part of a different customer order. Alternatively, the WMS 1205 can direct the item retrieval agent to return the container to a new storage location within the distribution site that optimizes subsequent retrievals of the container. In some such embodiments, the WMS 1205 determines the new storage location based on demand for the items in the container, remaining inventory in the container, or available shelf space. The WMS 1205 also directs the queued retrieval agents to move up so that the item picking agent can pick the items from the next retrieved container.

The WMS 1205 continues the retrieve-then-pick workflow until the items from each container retrieved by a queued container retrieval agent has been processed and the customer order has been fulfilled. The WMS 1205 can then reassign the container retrieval agents in retrieving and delivering a different set of containers to a second order packaging station and assign the item picking agents at the second order packaging station in picking items in order to fulfill a different customer order. It should be apparent that FIG. 12 illustrates the WMS 1205 coordinating and controlling one set of container retrieval agents and an item picking agent at one order packaging station in fulfillment of a single customer order. In some embodiments, the WMS 1205 simultaneously coordinates and controls different sets of container retrieval agents and item picking agents at different order packaging stations in order to simultaneously fulfill multiple orders.

The retrieve-then-pick workflow can also be performed in reverse to restock inventory. In some such embodiments, the WMS detects newly received item inventory that is awaiting restocking at one or more restocking stations. The WMS identifies the containers throughout the distribution site that store the inventory items and the storage locations for those containers. New containers may be identified for items that were not previously part of the inventory. The WMS then directs the set of the container retrieval agents in retrieving the identified containers from the identified storage locations. The container retrieval agents deliver the containers to the designated restocking stations where the newly inventory is received. As before, the WMS monitors correct retrieval of the containers based on sensory input obtained from the container retrieval agents.

The WMS detects delivery of a particular container to a restocking station by monitoring the movements and actions of the container retrieval agents. The WMS identifies the one or more items to be stored in the particular container. The WMS then instructs an item picking agent at the restocking station with identifying information about the item to be restocked in the particular container and, optionally, a quantity of the item.

The item picking agent scans each unit of the item that is placed in the particular container. The scans are relayed back to the WMS. The WMS updates in real-time the number of units that is now in stock or the inventory database where such data is stored. When the desired quantity is restocked or the all new inventory has been placed in the particular container, the WMS directs the container retrieval agent to return the particular container to a storage location within the distribution site.

Figure 13:
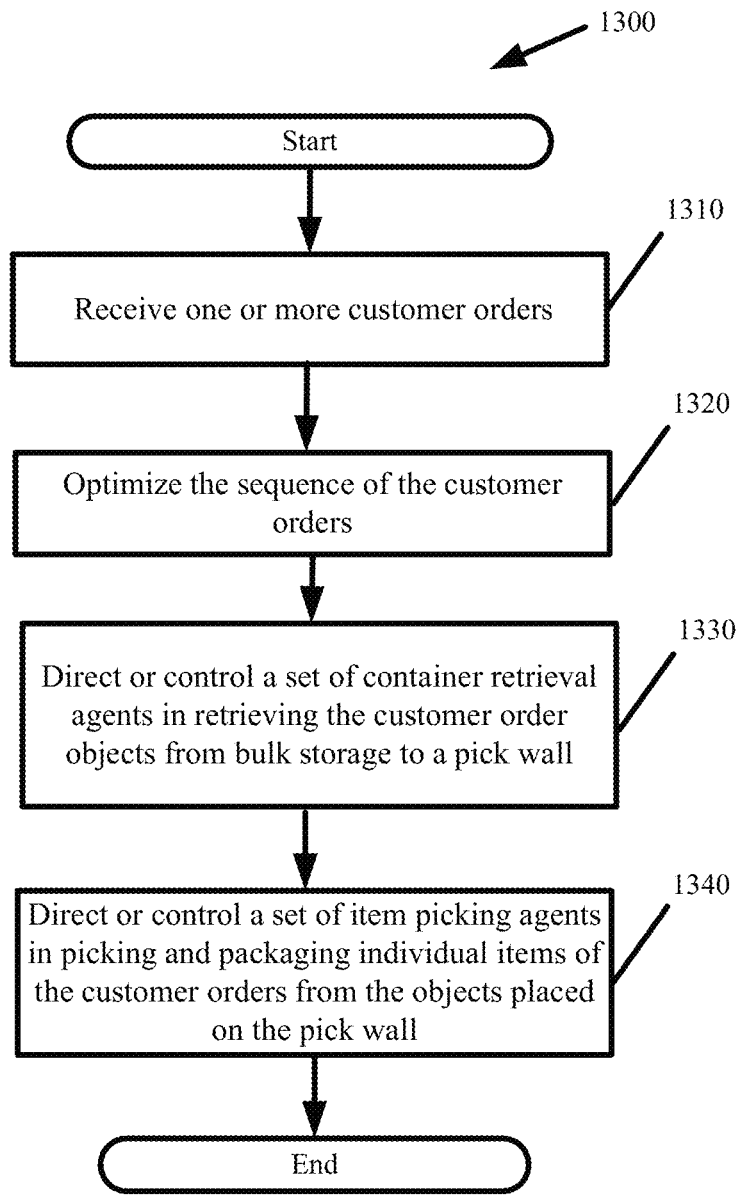
FIG. 13 presents a process performed by the WMS in implementing the hybrid workflow in accordance with some embodiments.

Some embodiments implement a hybrid workflow that incorporates aspects of the pick-to-cart workflow and the retrieve-then-pick workflow. FIG. 13 presents a process 1300 performed by the WMS in implementing the hybrid workflow in accordance with some embodiments. The process 1300 commences with the WMS receiving (at 1310) one or more customer orders. Each customer order specifies one or more items.

The process optimizes (at 1320) the sequence of the customer orders. The optimization can be based on several objectives including, for example, minimizing the total work for the retrieval agents and item picking agents, minimizing the average latency for all orders, minimizing the maximum latency for any individual order, etc. The optimization is based in part on the positioning and availability of the different agents as well as the positioning of the items of the customer orders. The optimization attempts to contemporaneously fulfill orders that include common items or items that are positioned next to one another within a distribution site so as to minimize the number and time of the agents needed to fulfill the orders.

The process directs or controls (at 1330) a set of retrieval agents in retrieving the customer order objects from bulk storage to a "pick wall". The customer order objects include containers, bins, or totes positioned on racks distributed about the bulk storage when one or more items of the customer orders are grouped or stored within the containers, bins, or totes. The customer order objects can also include the individual customer order items when the items are separately packaged or stored in bulk storage outside of a container. Accordingly, the direction or control at step 1330 involves the retrieval agents retrieving either a container storing multiple units of an item or an item (that is not stored in a container) from the bulk storage to the pick wall. The bulk storage refers to the larger distribution site or warehouse housing the entire item inventory. In some embodiments, the pick wall comprises ergonomic shelving holding a fixed number of objects. In summary, the bulk storage is where all item inventory is stored and the pick wall is used to aggregate the objects of one or more customer orders awaiting fulfillment.

The direction at 1330 involves the WMS identifying the one or more objects to be transferred to the pick wall, identifying the location of the objects, identifying the location of the pick wall, and assigning tasks or controlling the set of container retrieval in transferring the objects from bulk storage to the pick wall. When a retrieval agent places an object on the pick wall, the agent scans the object and/or the location of the object about the pick wall. The information is passed back to the WMS. The WMS tracks the objects currently on the pick wall and their locations based on the information provided by the retrieval agents.

Should the pick wall already include objects used to fulfill previous orders, the WMS clears space for objects of unfulfilled customer orders by directing the set of retrieval agents in returning one or more objects that are no longer needed back into bulk storage. In some embodiments, the WMS monitors a retrieval agent transferring a new object to the pick wall and then directs that retrieval agent in returning a different object already on the pick wall back into bulk storage.

In some embodiments, the WMS directs or controls the agents in removing from the pick wall and returning into bulk storage, objects not specified as part of any current customer orders being fulfilled. The WMS can also employ replacement algorithms to determine the objects to remove from the pick wall and return back into bulk storage. In some embodiments, the WMS monitors the least recently used objects, the most frequently used objects, or secondary or subsequent retrievals from the same object or container in order to select which objects to retain on the pick wall and which ones to remove from the pick wall and return to bulk storage. Still more complex algorithms based on the optimization objectives at step 1320, predictive analytics, pattern recognition, or machine learning (based on historical trends, social media feeds, and other external data feeds) can be used by the WMS in determining the objects to remove from the pick wall and return back into bulk storage. For instance, the WMS may predict that a customer order involving first and second items will frequently add a third item. Accordingly, the WMS may retain on the pick wall or retrieve to the pick wall, the container storing the third item in anticipation of the customer order adding the third item. More generally, the predictive analytics or pattern recognition performed by the WMS tracks customer order seasonality, sequence, and frequency, item order seasonality, sequence, and frequency, and commonality of items ordered by the same customer and different customers and uses the tracked analytics to optimize the pick wall. For example, the WMS tracks a particular item that is frequently ordered by multiple customers on Friday for receipt before the start of the next week. Accordingly, before the start of Friday order fulfillment, the WMS directs a retrieval agent to place the container storing the particular item on the pick wall and the WMS retains the container on the pick wall throughout the Friday order fulfillment cycle.

Contemporaneous with the direction of the retrieval agents in populating the pick wall with objects from bulk storage, the process also involves the WMS directing or controlling (at 1340) a set of item picking agents in picking individual items of the customer orders from the pick wall in order to fulfill those orders. Based on the information relayed from the retrieval agents to the WMS, the WMS can notify the item picking agents when and where certain objects are available at the pick wall. The WMS can granularly assign tasks that direct or control the sequence with which the item picking agents pick items from the pick wall.

The pick wall effectively acts as a morphing container cache. The cache provides the item picking agents access to all objects within the distribution site as they are needed from a single location that has space for a limited subset of all objects at any give time. The cache eliminates the need for the item picking agents to travel within the distribution site while allowing multiple item picking agents access to the same cached set of objects. The pick wall differs from the packaging station described above in that objects for different customer orders can be placed on the pick wall and that two or more item picking agents can access the pick wall in order to fulfill the same or different customer orders contemporaneously by picking items from the cached objects.

An example is now given to illustrate the hybrid workflow. The WMS tasks a particular item picking agent with fulfillment of a particular customer order. The particular customer order specifies four different items that are normally found in four different containers dispersed in different areas of the distribution site. The hybrid workflow described as part of FIG. 13 allows the particular item picking agent to move only about the pick wall to access the four containers and pick and package the items of the particular customer order therefrom.

It should be noted that certain items (e.g., large items) are not stored in any containers, and are instead directly stored on the distribution site racks. For such items, the retrieval agents can directly transfer the item to the pick wall and the item picking agent will subsequently transfer the item into a package for the corresponding customer order.

Figure 14:
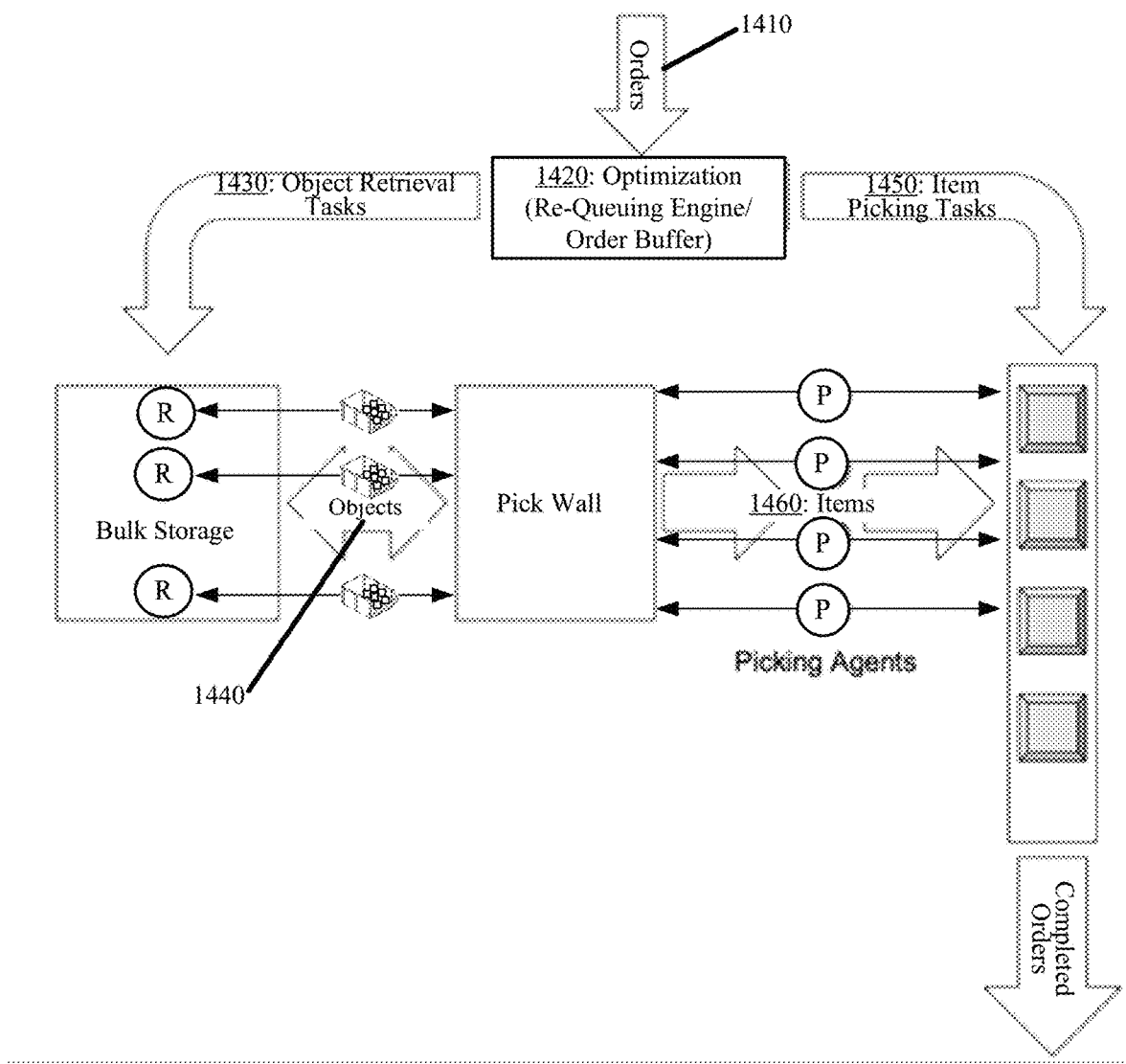
FIG. 14 conceptually illustrates the hybrid workflow in accordance with some embodiments.

FIG. 14 conceptually illustrates the hybrid workflow in accordance with some embodiments. The workflow and the agents illustrated therein are under direction or control of the WMS. The figure illustrates received customer orders at 1410 and the WMS optimizing the order sequence at 1420.

At 1430, the WMS assigns the tasks directing or controlling the retrieval agents in transferring the containers storing the items for the current set of customer orders to the pick wall. 1440 illustrates the execution of the container retrieval tasks and the containers being transferred to the pick wall by the retrieval agents.

At 1450, the WMS contemporaneously assigns the tasks directing or controlling the item picking agent in fulfilling the customer order. The assigned tasks cause the item picking agents to pick the corresponding order items from the pick wall and package the items for shipment at 1460.

As with the retrieve-then-pick workflow, the hybrid workflow of FIGS. 13 and 14 can also be performed in reverse to restock inventory. In some such embodiments, cases of new or replenished items are received by the item picking agents. The item picking agents then transfer the items to the correct container about the pick wall. For new items, any empty container on the pick wall can be used. For replenished items, the item picking agent adds to the container that stores the current depleted inventory or adds to an empty container that is then stored alongside other containers storing the same items.

The WMS monitors the item picking agents to determine when new or replenished items have been placed into the correct containers and the containers are full or there is no additional inventory to add. The WMS then directs or controls the retrieval agents in transferring the containers from the pick wall back into bulk storage until the items are once again needed to fulfill a customer order.

As noted above, the WMS provides additional functionality in addition to coordinating and controlling agents in executing one or more workflows. In some embodiments, the WMS provides failover and statistical performance for the workflow based on the monitoring.

The WMS initiates failover in response to assigning a task to an agent, monitoring the agent in performance of the task, and determining from the monitoring that the agent has not completed the task within an expected interval or has reported an error. In such cases, the WMS assigns the task to a different agent, dispatches a troubleshooting administrator to diagnose and correct the failure, or redefines the task for the agent with more granularity or with an alternative set of operations with which the agent can complete the task.

The agent monitoring further allows the WMS to track performance and efficiency of the overall system. In some embodiments, the WMS derives a set of performance metrics based on the efficiency with which the agents complete assigned tasks. In embodiments that use the WMS for order fulfillment, the WMS can quantify the average number of items picked per unit of time, the average number of items packaged per unit of time, the average number of orders fulfilled per unit of time, and the cost per item pick or order fulfillment based on the monitoring of the agents. In so doing, the WMS enables alternate billing models including, for example, billing a customer based on the number of items picked or packaged by the agents on a periodic basis.

The performance metrics can be used to scale the deployment of agents under WMS control. For instance, if the order fulfillment rate is less than an expected order intake rate, the WMS can deploy additional agents to ramp up the picking, retrieval, and packaging of items. Similarly, if the agents are performing faster than the incoming rate of orders, the WMS can deallocate certain agents, thereby lowering the operational cost of the WMS. The WMS can thereby control, optimize, and predict costs as demand fluctuates.

The monitoring is also a mechanism by which the WMS optimizes the workflows.

The WMS can record movements and timing of each of the agents in performance of the tasks assigned by the WMS. The WMS can adjust certain assigned tasks and replay the movements and timing with the adjusted tasks to determine if the tasks could be performed more efficiently. The same recorded movements and timing can be used to simulate workflow performance with any agent deployment in any mapped environment. In particular, the WMS can record the speed with which human and robot agents perform certain tasks. The WMS can playback execution of any arbitrary allocation of tasks by any deployment of agents in any new environment to determine expected performance.

The simulation can be visual. In some embodiments, the simulation illustrates the virtual execution of assigned tasks by some deployment of virtual agents in the mapped environment, wherein the virtual agents execute the tasks according to the recorded real-world performance parameters.

The WMS is a system formed by the WMS deployed agents and one or more directors. The directors are special purposed machines with network connectivity, processors that generate and optimize task assignments as new orders are received, and memory for tracking the agents, monitoring order fulfillment, mapping a distribution site including the assets therein, and tracking item inventory in some embodiments. The directors are communicably coupled to the agents through wireless and wired network connectivity. The WMS directors maintain network connections with the robot agents. The WMS directors maintain network connections with network enabled devices carried by, on, or near human agents. Through these network connections, the directors automate and optimize the workflow execution by deploying, instructing, and directing the agents as described above. The directors also remotely monitor the agents as part of optimizing, verifying, and providing failover during workflow execution.

The directors include processors that generate and optimize task assignments as new orders are received. The directors further include memory for tracking the agents, monitoring order fulfillment, mapping a distribution site including item storage locations, and tracking item inventory in some embodiments.

The different levels of control granularity allow automation to occur at the director level, at the agent level, or some combination of both. The directors can directly access sensors on devices carried by human workers or sensors of the robots in order to monitor position, verify picking, retrieval, and packaging operations, assist in navigation, and assist in item or container identification, picking, and retrieval. For example, if the human wears an augmented reality headset with one or more cameras, the directors can see what the human sees. Similarly, the directors can access actuators, motors, and other mechanical aspects of the robots in order to directly perform or control the picking, retrieval, packaging, and any other operation.

Although the workflows are executed in a distributed fashion by the agents, some embodiments centralized the coordination and control at the directors. The centralized coordination and control allows the directors to have a holistic accounting of the agent availability. As a result, the directors can better manage and optimize the allocation and deployment of the agents in performance of different tasks. The directors can even reallocate an item picking agent as an item retrieval agent and vice versa if there is excess of one set of agents and shortage of another set.

The directors can also actively or passively connect with resource assets. For example, the directors can maintain active connections with assets such as security doors, shelves, conveyors, etc. in order to directly access and control these assets. The directors can start a conveyor when items of one order have been bundled and move the bundle of items to a particular order packaging station before halting the conveyor. Other assets, such as three-dimensional space, are indirectly under director control. By coordinating access of the human and robot agents to the resources, the directors effectively control access to these assets as well.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:
1. A system comprising:
(i) a set of picking robots, each picking robot of the set of picking robots comprising:
a motorized base moving the picking robot between a subset of storage locations, where a plurality of objects of a particular customer order are stored, and a first destination, where the plurality of objects of the particular customer order are aggregated;
a mechanical retriever retrieving, at each storage location of the subset of storage locations, a different object of the particular customer order, and transferring each retrieved object to the first destination after retrieval of that retrieved object; and
a sensor wirelessly transmitting at least one signal in response to completed transfer of each object of the particular customer order to the first destination;
(ii) a retrieval robot initiating operation in response to collective signaling from the set of picking robots,
wherein the retrieval robot comprises a wireless radio and a motorized base, and
wherein the retrieval robot moves the plurality of objects of the particular customer order from the first destination to a second destination collectively at one time, via operation of the motorized base, in response to the wireless radio receiving a trigger, that is based on collective signaling from the sensors of the set of picking robots, indicating that all of the plurality of objects of the particular customer order have been transferred to the first destination; and

(iii) a device for coordinating and controlling the operation of at least the set of picking robots and the retrieval robot, the device comprising:
one or more processors configured to:
receive the particular customer order;
direct each picking robot of the set of picking robots in transferring the plurality of objects from the subset of storage locations to the first destination;
detect completed transfer of the plurality of objects based on the at least one signal received from each picking robot of the set of picking robots; and
operate the retrieval robot in moving the plurality of objects from the first destination to the second destination in response to detecting that the objects of the particular customer order have been transferred to the first destination based on the at least one signal received from the set of picking robots.

2. The system of claim 1 further comprising a movable storage apparatus comprising a volume for storing two or more objects separate and independent of the set of picking robots and the retrieval robot, wherein the storage apparatus is located at the first destination, wherein the set of picking robots transfer each retrieved object of the plurality of objects for the particular customer order to the moveable storage apparatus, and wherein the retrieval robot moves the plurality of objects of the particular customer order from the first destination to the second destination by pushing or pulling the moveable storage apparatus.

3. The system of claim 1, wherein the retrieval robot further comprises a storage volume into which the set of picking robots transfer each retrieved object of the particular customer order.

4. The system of claim 1, wherein the retrieval robot further comprises a storage volume as the first destination, and wherein the retrieval robot moves, via operation of the motorized base, adjacent to a first subset of the set of picking robots to receive a first set of the plurality of objects for the particular customer order during a first time, and moves adjacent to a second subset of the set of picking robots to receive a second set of the plurality of objects for the particular customer order during a second time that is after the first time.

5. The system of claim 1, wherein the retrieval robot further comprises a storage volume storing the plurality of objects of the particular customer order and a plurality of objects of a different second customer order after the set of picking robots complete transfer of the objects for the particular customer order to the first destination.

6. The system of claim 5, wherein the retrieval robot operates to move the plurality of objects of the second customer order from the second destination to a third destination via operation of the motorized base in response to a trigger, that is received on the wireless radio, indicating completed removal of the plurality of objects of the particular customer order from the storage volume of the retrieval robot at the second destination.

7. The system of claim 5, wherein the retrieval robot further comprises a retriever that transfers the plurality of objects of the particular customer order from the storage volume to the second destination, and that transfers the plurality of objects of the second customer order from the storage volume to a different third destination.

8. The system of claim 1
wherein the one or more processors are configured to:
direct each picking robot of the set of picking robots to the different subset of storage locations where at least one object of the plurality of objects of the particular customer order are stored;
direct the retrieval robot to move to the first destination; and
provide the trigger to the retrieval robot in response to receiving, from the sensor of the set of picking robots, the collective signaling indicating completed transfer of the plurality of objects of the particular customer order to the first destination.

9. The system of claim 1,
wherein the one or more processors are further configured to:
determine a storage location for each object of the particular customer order;
assign retrieval of a subset of objects at each subset of storage locations to a different picking robot of the set of picking robots; and
reserve for each picking robot of the set of picking robots resources providing the picking robot non-conflicting access to each storage location in an assigned subset of storage locations.

10. The system of claim 1, wherein the one or more processors are further configured to:
control the retrieval robot in moving a movable rack to a first location that is used by a first subset of set of the picking robots as the first destination for transferring a first subset of the plurality of objects during a first time;
control the retrieval robot in moving the movable rack to a different second location that is used by a different second subset of the set of picking robots as the first destination for transferring a second subset of the plurality of objects during a second time; and
detect that the plurality of objects of the particular customer order have been transferred to the movable rack based on the first subset of picking robots transferring the first subset of the objects to the moveable rack while at the first location, and the second subset of the picking robots transferring the second subset of the objects to the moveable rack while at the second location.

11. The system of claim 1, wherein the set of picking robots is a first set of picking robots, the system further comprising:
a second set of picking robots;
wherein the one or more processors are further configured to:
direct each picking robot of the second set of picking robots in transferring a different plurality of objects of a second customer order from one or more storage locations to a different third destination;
detect completed transfer of the plurality of objects of the second customer order based on wireless signaling received from each picking robot of the second set of picking robots; and
operate the retrieval robot in collectively moving the plurality of objects of the second customer order from the third destination to the second destination at one time in response to detecting that the plurality of objects of the second customer order have been transferred to the third destination based on the wireless signaling received from the second set of picking robots.

12. The system of claim 1, wherein the one or more processors are further configured to:
reserve for each picking robot of the set of picking robots resources providing the picking robot non-conflicting access to each storage location in an assigned subset of storage locations.

13. A method comprising:

receiving a particular customer order comprising a plurality of objects at a robot controller;

directing, by the robot controller, each picking robot of a set of picking robots in transferring the plurality of objects from a subset of storage locations, where the plurality of objects of the particular customer order are stored, to a first destination, where the plurality of objects of the particular customer order are aggregated;

moving the set of picking robots between the subset of storage locations in response to said directing by the robot controller;

retrieving, with a different robot of the set of picking robots at each storage location of the subset of storage locations, a different object of the particular customer order;

transferring, after said retrieving, the plurality of objects from the subset of storage locations to the first destination using the set of picking robots;

transmitting, from the set of picking robots, at least one signal in response to completed transfer of each object of the particular customer order to the first destination;

detecting completed transfer of the plurality of objects at the robot controller based on the at least one signal received from each picking robot of the set of picking robots; and operating a retrieval robot in response to the robot controller detecting the completed transfer of the plurality of objects based on collective signaling from the set of picking robots, wherein operating the retrieval robot comprises providing a trigger from the robot controller to the retrieval robot; and moving the plurality of objects of the particular customer order from the first destination to a second destination collectively at one time with the retrieval robot in response to the trigger.

* * * * *